(12) United States Patent
He et al.

(10) Patent No.: US 12,416,840 B2
(45) Date of Patent: Sep. 16, 2025

(54) CHOLESTERIC LIQUID CRYSTAL WINDOW HAVING MULTIPLE STABLE STATES AND METHODS FOR USE

(71) Applicant: CORNING INCORPORATED, Corning, NY (US)

(72) Inventors: Mingqian He, Horseheads, NY (US); Xiang-Dong Mi, Pittsford, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 18/724,076

(22) PCT Filed: Dec. 13, 2022

(86) PCT No.: PCT/US2022/052692
§ 371 (c)(1),
(2) Date: Jun. 25, 2024

(87) PCT Pub. No.: WO2023/129370
PCT Pub. Date: Jul. 6, 2023

(65) Prior Publication Data
US 2025/0060643 A1      Feb. 20, 2025

Related U.S. Application Data

(60) Provisional application No. 63/295,212, filed on Dec. 30, 2021.

(51) Int. Cl.
*G02F 1/137* (2006.01)
*E06B 9/24* (2006.01)
*G02F 1/139* (2006.01)

(52) U.S. Cl.
CPC ............ *G02F 1/13718* (2013.01); *E06B 9/24* (2013.01); *G02F 1/1391* (2013.01); *E06B 2009/2464* (2013.01); *G02F 2201/44* (2013.01)

(58) Field of Classification Search
CPC ....... G02F 1/13718; G02F 1/1391; E06B 9/24
See application file for complete search history.

(56) References Cited

U.S. PATENT DOCUMENTS

| | | | |
|---|---|---|---|
| 4,483,700 | A | 11/1984 | Forker et al. |
| 5,661,533 | A | 8/1997 | Wu et al. |
| 5,674,790 | A | 10/1997 | Araujo |
| 6,816,227 | B2 | 11/2004 | Mi et al. |

(Continued)

FOREIGN PATENT DOCUMENTS

| | | |
|---|---|---|
| CA | 2218933 A1 | 11/1996 |
| CN | 1245479 C | 3/2006 |

(Continued)

OTHER PUBLICATIONS

Fuh, A. Y.-G., et al., "Electrically controllable smart window with greyscale based on polymer-stabilised cholesteric texture films", Liquid Crystals, vol. 43, No. 12, 2016, pp. 1784-1790.

(Continued)

*Primary Examiner* — Joseph L Williams
(74) *Attorney, Agent, or Firm* — Daniel J. Greenhalgh

(57) ABSTRACT

Disclosed are liquid crystal devices including at least one cholesteric liquid crystal layer and having multiple stable states. Also disclosed are liquid crystal windows having at least three stable states in the absence of voltage.

21 Claims, 10 Drawing Sheets

(56) References Cited

U.S. PATENT DOCUMENTS

| | | |
|---|---|---|
| 7,666,511 B2 | 2/2010 | Ellison et al. |
| 10,871,694 B2 | 12/2020 | Yang et al. |
| 2010/0225677 A1 | 9/2010 | Shingai et al. |
| 2023/0236449 A1* | 7/2023 | He .................. G02F 1/1347 349/74 |

FOREIGN PATENT DOCUMENTS

| | | |
|---|---|---|
| CN | 100338506 C | 9/2007 |
| WO | 2021/216364 A1 | 10/2021 |
| WO | 2024/107415 A1 | 5/2024 |

OTHER PUBLICATIONS

Gandhi et al.; "Gray Scale Drive Schemes for Bistable Cholesteric Reflective Display"; Asia Display 98, pp. 127-130 (1998).

Huang et al.; "LP-I: Late-news poster: Gray scale of bistable reflective cholesteric displays"; SID Digest 98, pp. 810-813 (1998).

Huang X., et al., "Dynamic drive for bistable reflective cholesteric displays: a rapid addressing scheme", Journal Of The Society For Information Display, Society For Information Display, US, Jan. 1995, pp. 347-350.

International Search Report and Written Opinion of the International Searching Authority; PCT/US2022/052692; mailed on Apr. 12, 2023, 14 pages; European Patent Office.

* cited by examiner

CHOLESTERIC LIQUID CRYSTAL WINDOW HAVING MULTIPLE STABLE STATES AND METHODS FOR USE

CROSS-REFERENCE TO RELATED APPLICATIONS

This application is a national stage entry under 35 U.S.C. § 371 of International Application No. PCT/US2022/052692, filed on Dec. 13, 2022, which claims the benefit of priority under 35 U.S.C. § 119 of U.S. Provisional Application No. 63/295,212 filed Dec. 30, 2021, the content of each of which is incorporated herein by reference in its entirety.

FIELD OF THE DISCLOSURE

The disclosure relates generally to liquid crystal devices comprising at least one cholesteric liquid crystal layer, and more particularly to cholesteric liquid crystal windows comprising at least three stable states in the absence of voltage.

BACKGROUND

Liquid crystal devices are used in various architectural and transportation applications, such as windows, doors, space partitions, and skylights for buildings and automobiles. Liquid crystal devices can serve as "smart" or tintable windows for many commercial applications. It is desirable for smart liquid crystal windows to provide high contrast ratio between the on and off states. Bistable cholesteric liquid crystal materials can be used in smart windows to provide two stable states in the absence of applied voltage. The first stable state is a planar state that can be transparent or reflective for visible light. The second stable state is a focal conic state that is opaque for visible light. The window can be switched from the first stable state to the second stable state and vice versa via a voltage pulse.

It may also be desirable to provide one or more grayscale states between the on and off states. However, bistable cholesteric liquid crystal windows do not have the ability to switch between three or more stable states. A driving voltage is required to switch the cholesteric liquid crystal into an intermediate or grayscale state, which is not energy efficient. It would be preferable to provide multiple stable states at zero voltage that do not consume power.

As such, there is a need for cholesteric liquid crystal windows with multiple, e.g., three or more, stable states in the absence of applied voltage. It would also be advantageous to provide liquid crystal windows capable of producing three or more levels of visible light transmission and/or haze. It would further be advantageous to improve the energy efficiency and optical effectiveness of such liquid crystal windows.

SUMMARY

Disclosed herein are liquid crystal windows comprising at least one cholesteric liquid crystal layer and having at least three stable states in the absence of voltage. The disclosure relates, in various embodiments, to a liquid crystal window comprising: (a) a first glass substrate; (b) a second glass substrate; (c) an electrode pair disposed between the first and second glass substrates; and (d) a cholesteric liquid crystal layer disposed between the first and second glass substrates and in electrical contact with the electrode pair, wherein the cholesteric liquid crystal layer comprises at least three stable states, a first stable state $S1$ is a planar state having a first visible light transmittance $T1$ and a first haze $H1$, a second stable state $S2$ is a focal conic state having a second visible light transmittance $T2$ and a second haze $H2$, and a third stable state is grayscale $S3$ state having a third visible light transmittance $T3$ and a third haze $H3$, wherein $T1>T3>T2$ and $H1<H3<H2$. In some embodiments (a) $T1>80\%$ and $H1<3\%$ and/or (b) $T2<3\%$ and $H2>90\%$.

According to various embodiments, the third transmittance $T3=(T1+T2)/2$. In other embodiments, the third haze $H3=(H1+H2)/2$. The cholesteric liquid crystal layer can further comprise a fourth stable state $S4$, wherein the fourth stable state is a grayscale state having a fourth visible light transmittance $T4$ and a fourth haze $H4$, and wherein $T1>T4>T2$ and $H1<H4<H2$.

In non-limiting embodiments, the electrode pair can comprise a first electrode and a second electrode and the cholesteric liquid crystal layer can be disposed between the first and second electrodes. According to further embodiments, the liquid crystal window additionally comprises a third glass substrate and a first interlayer disposed between the first glass substrate and the third glass substrate. In still further embodiments, the liquid crystal window additionally comprises a third glass substrate and a sealed gap disposed between the first glass substrate and third glass substrate, the sealed gap comprising at least one insulating gas. According to certain embodiments, the liquid crystal window can comprise a fourth glass substrate and a second interlayer disposed between the second glass substrate and the fourth glass substrate. In various embodiments, the liquid crystal window can comprise a fourth glass substrate and a sealed gap disposed between the second glass substrate and fourth glass substrate, the sealed gap comprising at least one insulating gas.

Non-limiting embodiments of the liquid crystal window can comprise at least one additional liquid crystal layer or an electrochromic layer, or combinations thereof. The liquid crystal window can also comprise an interstitial glass substrate disposed between the first and second glass substrates, wherein the cholesteric liquid crystal layer and the electrode pair are disposed between the first glass substrate and the interstitial glass substrate, and wherein an additional liquid crystal layer or an electrochromic layer is disposed between the interstitial glass substrate and the second glass substrate. A second electrode pair can be disposed between the interstitial glass substrate and the second glass substrate.

Also disclosed herein are methods for switching a liquid crystal window between stable states, the methods comprising: (a) applying a first voltage pulse to the electrode pair to switch the cholesteric liquid crystal layer from the first, second, or third stable state to a homeotropic state; and (b) applying a second voltage pulse to the electrode pair to switch the cholesteric liquid crystal layer from the homeotropic state to the first, second, or third stable state, wherein the first voltage pulse has a first RMS voltage $V1$ that is greater than a second RMS voltage $V2$ of the second voltage pulse.

According to various embodiments, the second RMS voltage to switch the cholesteric liquid crystal layer to the first stable state is represented by $V2\text{-}1$, the second RMS voltage to switch the cholesteric liquid crystal layer to the second stable state is represented by $V2\text{-}2$, and the second RMS voltage to switch the cholesteric liquid crystal layer to the third stable state is represented by $V2\text{-}3$. In certain embodiments, (a) $V2\text{-}1<V2\text{-}3<V2\text{-}2$ or (b) $V2\text{-}2<V2\text{-}3<V2\text{-}1$. In additional embodiments, (a) $V1>V2\text{-}1\geq 0.9*V1$ or (b) $0.1*V1>V2\text{-}1\geq 0$. In further embodiments, $0.7*V1>V2\text{-}$ $V2 \geq 0.4*V1$. In yet further embodiments, (a) $0.9*V1 > V2-3 \geq 0.7*V1$ or (b) $0.7*V1 > V2-3 \geq 0.4*V1$.

Further disclosed herein are methods for switching a liquid crystal window between stable states, the methods comprising: (a) applying a first voltage pulse to the electrode pair to switch the cholesteric liquid crystal layer from the first, second, or third stable state to a homeotropic state; (b) applying a second voltage pulse and a third voltage pulse to switch the cholesteric liquid crystal layer from the homeotropic state to the first, second, or third stable state, wherein the first voltage pulse has a first RMS voltage V1 that is greater than a second RMS voltage V2 of the second voltage pulse.

According to various embodiments, the third voltage pulse has a third RMS voltage V3, and the second RMS voltage to switch the cholesteric liquid crystal layer to the first stable state is represented by V2-1, the second RMS voltage to switch the cholesteric liquid crystal layer to the second stable state is represented by V2-2, and the second RMS voltage to switch the cholesteric liquid crystal layer to the third stable state is represented by V2-3. In certain embodiments, (a) $V2-1 < V2-3 < V2-2$ or (b) $V2-2 < V2-3 < V2-1$. In other embodiments, $V1 > V2-1 \geq 0.9*V1$. In further embodiments, (a) $0.7*V1 > V2-2 > 0$ or (b) $V1 > V3 > V2-2$. In still further embodiments, $V1 > V3 > V2-3 > V2-2$. In various embodiments, $V3 = 0.9*V1$.

Additional features and advantages of the disclosure will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary and are intended to provide an overview or framework for understanding the nature and character of the claims. The accompanying drawings are included to provide a further understanding of the disclosure and are incorporated into and constitute a part of this specification. The drawings illustrate various embodiments of the disclosure and together with the description serve to explain the principles and operations of the various embodiments.

BRIEF DESCRIPTION OF THE DRAWINGS

The following detailed description can be further understood when read in conjunction with the following drawings. Whenever possible, the same reference numerals will be used throughout the drawings to refer to the same or like parts. It is to be understood that the figures are not drawn to scale and the size of each depicted component or the relative size of one component to another is not intended to be limiting.

DETAILED DESCRIPTION

Disclosed herein are liquid crystal windows comprising: (a) a first glass substrate; (b) a second glass substrate; (c) an electrode pair disposed between the first and second glass substrates; and (d) a cholesteric liquid crystal layer disposed between the first and second glass substrates and in electrical contact with the electrode pair, wherein the cholesteric liquid crystal layer comprises at least three stable states, a first stable state S1 is a planar state having a first visible light transmittance T1 and a first haze H1, a second stable state S2 is a focal conic state having a second visible light transmittance T2 and a second haze H2, and a third stable state is grayscale S3 state having a third visible light transmittance T3 and a third haze H3, wherein T1>T3>T2 and H1<H3<H2. According to various embodiments, (a) T1>80% and H1<3% and/or (b) T2<3% and H2>90%, Also disclosed herein are methods for switching a liquid crystal window between stable states, the methods comprising: (a) applying a first voltage pulse to the electrode pair to switch the cholesteric liquid crystal layer from the first, second, or third stable state to a homeotropic state; and (b) applying a second voltage pulse to the electrode pair to switch the cholesteric liquid crystal layer from the homeotropic state to the first, second, or third stable state, wherein the first voltage pulse has a first RMS voltage V1 that is greater than a second RMS voltage V2 of the second voltage pulse.

Further disclosed herein are methods for switching a liquid crystal window between stable states, the methods comprising: (a) applying a first voltage pulse to the electrode pair to switch the cholesteric liquid crystal layer from the first, second, or third stable state to a homeotropic state; (b) applying a second voltage pulse and a third voltage pulse to switch the cholesteric liquid crystal layer from the homeotropic state to the first, second, or third stable state, wherein the first voltage pulse has a first RMS voltage V1 that is greater than a second RMS voltage V2 of the second voltage pulse.

Liquid Crystal Windows

Embodiments of the disclosure will now be discussed with reference to FIGS. 1-2, which illustrate various aspects of the liquid crystal windows disclosed herein. The following general description is intended to provide an overview of the claimed devices, and various aspects will be more specifically discussed throughout the disclosure with reference to the non-limiting depicted embodiments, these embodiments being interchangeable with one another within the context of the disclosure.

Figure 1A:
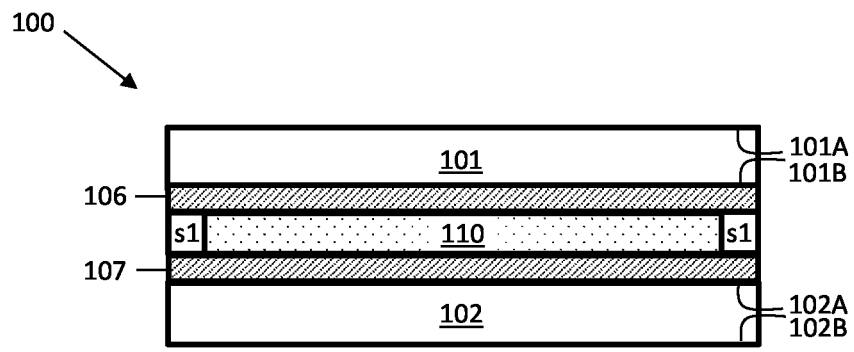
FIGS. 1A-D depict cross-sectional views of liquid crystal windows according to various embodiments of the disclosure.
Figure 1B:
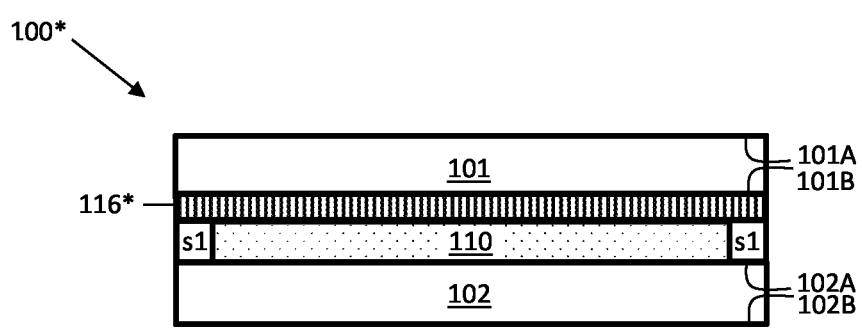
Figure 1C:
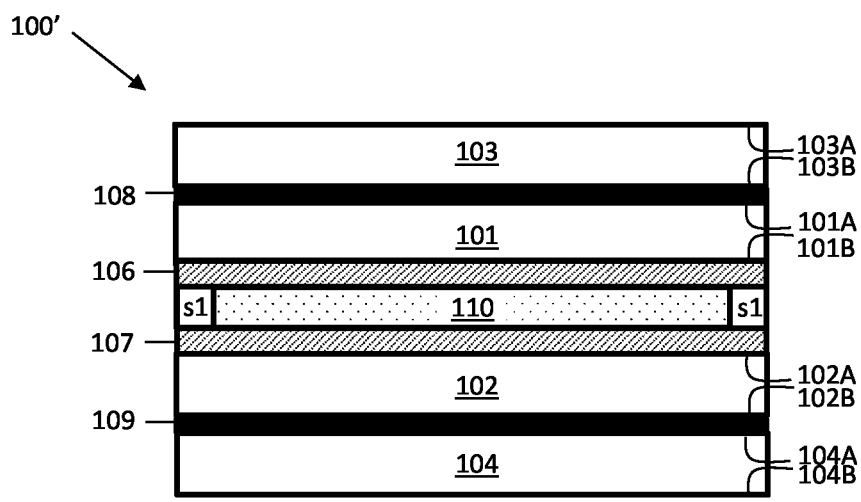
Figure 1D:
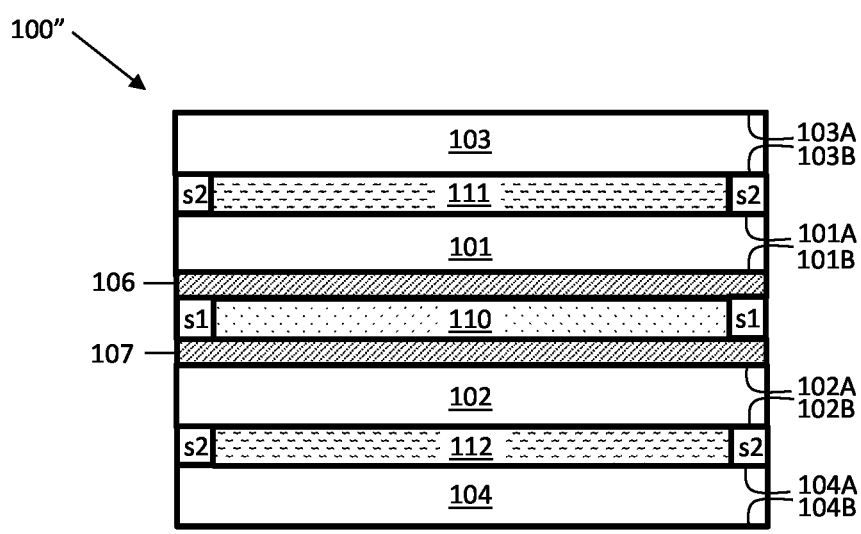
Figure 2A:
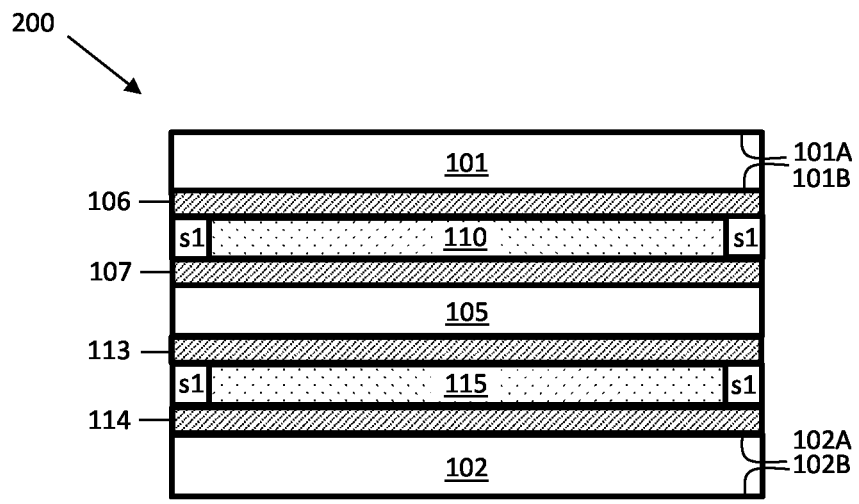
FIGS. 2A-B depict cross-sectional views of liquid crystal windows according to additional embodiments of the disclosure.
Figure 2B:
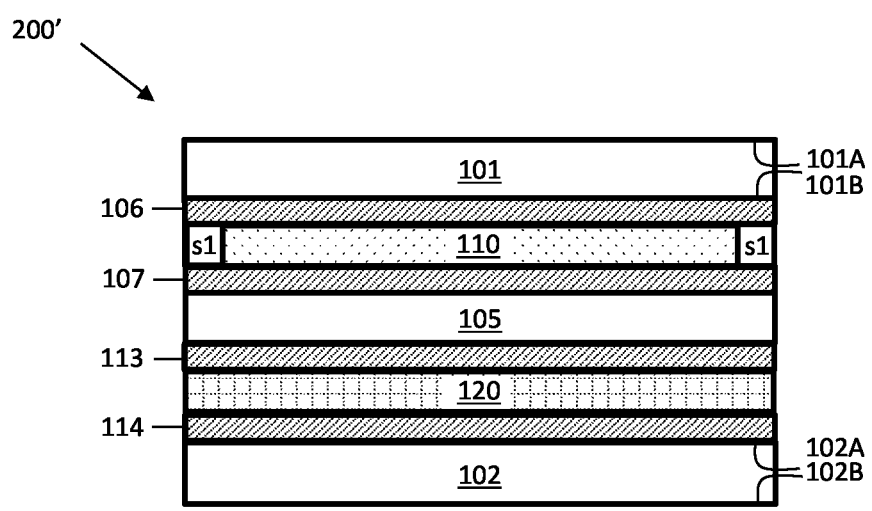

FIGS. 1A-D and 2A-B illustrate cross-sectional views of non-limiting embodiments of liquid crystal windows 100, 100\*, 100', 100" (FIGS. 1A-D) and 200, 200' (FIGS. 2A-B). The liquid crystal windows disclosed herein may have a single cell configuration, e.g., a single liquid crystal layer controlled by a single pair of electrodes, as depicted in FIGS. 1A-D. The liquid crystal windows may also comprise two liquid crystal layers, as depicted in FIG. 2A, or more than two liquid crystal layers (not depicted). The liquid crystal window may also comprise a liquid crystal layer and an electrochromic layer, as depicted in FIG. 2B, or any combinations of two or more of such layers.

Referring to FIG. 1A, liquid crystal window 100 includes first and second glass substrates 101, 102, an electrode pair comprising first and second electrodes 106, 107, and cholesteric liquid crystal layer 110. First glass substrate 101 comprises a first surface 101A and a second surface 101B. A first electrode 106 is formed on and/or in direct contact with second surface 101B of first glass substrate 101. Similarly, second glass substrate 102 comprises a first surface 102A and a second surface 102B. A second electrode 107 is formed on and/or in direct contact with first surface 102A of second glass substrate 102. The cholesteric liquid crystal layer 110 is disposed between and in electrical contact with first and second electrodes 106, 107. In some embodiments, the cholesteric liquid crystal layer 110 is in direct physical contact with first and second electrodes 106, 107. According to various embodiments, the first and second glass substrates 101, 102 and their corresponding electrodes 106, 107 can define a sealed gap or cell that contains the liquid crystal material. Seals s1 can be used to contain the liquid crystal material in the cholesteric liquid crystal layer 110.

Although not depicted, liquid crystal window 100 can further include at least one alignment layer disposed between first electrode 106 and cholesteric liquid crystal layer 110 and/or between second electrode 107 and cholesteric liquid crystal layer 110. According to various embodiments, no additional layers are present between the first electrode 106 and the first glass substrate 101, between the first electrode 106 and the cholesteric liquid crystal layer 110, between the second electrode 107 and the second glass substrate 102, and/or between the second electrode 107 and the cholesteric liquid crystal layer 110. In further embodiments, the liquid crystal window 100 consists of the first glass substrate 101, second glass substrate 102, the first electrode 106, the second electrode 107, and the cholesteric liquid crystal layer 110.

Liquid crystal window 100 can be produced, for example, by coating, printing, or otherwise depositing the first electrode layer 106 on the second surface 101B of the first glass substrate 101, and coating, printing, or otherwise depositing the second electrode layer 106 on the first surface 102A of the second glass substrate 102. The glass substrate/electrode assemblies can then be arranged to form a gap, which can be filled with liquid crystal material to form cholesteric liquid crystal layer 110. In alternative embodiments, liquid crystal material can be deposited on the first glass substrate in vacuum, the second glass substrate can then be placed over the liquid crystal material to form the cholesteric liquid crystal layer. In some embodiments, spacers (not illustrated) can be used to maintain the desired cell gap and resulting liquid crystal layer thickness. The liquid crystal material can be sealed in the cell gaps around all edges using any suitable material, such as optically or thermally curable resins, to form seals s1.

FIG. 1B illustrates a non-limiting configuration for a liquid crystal window 100* including first and second glass substrates 101, 102, an interdigitated electrode pair 116*, and cholesteric liquid crystal layer 110. Interdigitated electrodes comprise a pair of electrodes on a single surface that are energized with different voltages. Liquid crystal layer(s) can be controlled by interdigitated electrodes using In Plane Switching (IPS). An electric field starts at the higher voltage interdigitated electrode, travels through any surrounding media (such as an adjacent liquid crystal layer), and terminates at the lower voltage interdigitated electrode.

First glass substrate 101 comprises a first surface 101A and a second surface 101B. The interdigitated electrode pair 116* is formed on and/or in direct contact with second surface 101B of first glass substrate 101. An applied electric field can then begin from a high voltage interdigitated electrode on second surface 101B, travel through cholesteric liquid crystal layer 110, and end at a low voltage interdigitated electrode on surface 101B. Second glass substrate 102 comprises a first surface 102A and a second surface 102B. Although not depicted, interdigitated electrode pair 116* can alternatively be formed on and/or in direct contact with first surface 102A of second glass substrate 102. The cholesteric liquid crystal layer 110 is disposed between first and second glass substrates 101, 102 and is in electrical contact with interdigitated electrodes 116*. In some embodiments, the cholesteric liquid crystal layer 110 is in direct physical contact with interdigitated electrodes 116*. According to various embodiments, the first and second glass substrates 101, 102 can define a sealed gap or cell that contains the liquid crystal material. Seals s1 can be used to contain the liquid crystal material in the cholesteric liquid crystal layer 110.

Although not depicted, liquid crystal window 100* can further include at least one alignment layer disposed between interdigitated electrode 116* and cholesteric liquid crystal layer 110 and/or between second glass substrate 102 and cholesteric liquid crystal layer 110. According to various embodiments, no additional layers are present between the interdigitated electrode 116* and the first glass substrate 101, between the interdigitated electrode 116* and the cholesteric liquid crystal layer 110, and/or between the second glass substrate 102 and the cholesteric liquid crystal layer 110. In further embodiments, the liquid crystal window 100* consists of the first glass substrate 101, second glass substrate 102, the interdigitated electrode 116*, and the cholesteric liquid crystal layer 110.

Liquid crystal window 100* can be produced, for example, by patterning, printing, or otherwise depositing the interdigitated electrode pair 116* on the second surface 101B of the first glass substrate 101. The glass substrates 101, 102 can then be arranged to form a gap, which can be filled with liquid crystal material to form cholesteric liquid crystal layer 110. In some embodiments, spacers (not illustrated) can be used to maintain the desired cell gap and resulting liquid crystal layer thickness. The liquid crystal material can be sealed in the cell gaps around all edges using any suitable material, such as optically or thermally curable resins, to form seals s1.

Referring to FIG. 1C, liquid crystal window 100' can further comprise third and/or fourth substrates 103, 104. Third substrate 103 comprises a first surface 103A and a second surface 103B. Fourth substrate 104 comprises a first surface 104A and a second surface 104B. Third and fourth substrates 103, 104 can be attached or laminated to first and second substrates 101, 102, respectively, by first and second interlayers 108, 109, respectively. Although FIG. 1C depicts a liquid crystal window 100' comprising both a third and a fourth substrate, it is possible for the liquid crystal window 100' to comprise only one of such substrates, for instance, second surface 103B of third substrate 103 can be attached to first surface 101A of the first glass substrate 101 by first interlayer 108 and a fourth substrate may not be present. Alternatively, first surface 104A of fourth substrate 104 can be attached to the second surface 102B of the second glass substrate 102 by second interlayer 109 and the third substrate may not be present.

The liquid crystal window 100' depicted in FIG. 1C may be advantageous from a safety standpoint. If the third substrate 103 is broken or damaged, the first interlayer 108 can hold any broken pieces in place. Similarly, if the fourth substrate 104 is broken or damaged, the second interlayer 109 can hold it in place. Additional advantages can also include protection from ultraviolet (UV) and/or infrared radiation. At least one of the third or fourth substrate 103, 104 can comprise a low emissivity glass or can comprise a coating that reduces the amount of infrared and ultraviolet light that passes through the substrate. The interlayer can also be used to reduce UV transmittance. By way of non-limiting example, liquid crystal window 100' can be oriented such that third substrate 103 is the outermost substrate facing the exterior, e.g., outside of a building or vehicle, and fourth substrate 104 is the innermost substrate and faces the interior, e.g., inside of a building or vehicle. In this case, third substrate 103 and/or first interlayer 108 can provide UV and/or infrared light blocking properties. Of course, the reverse orientation is also possible, in which case the fourth substrate 104 and/or second interlayer 109 can provide UV and/or infrared light blocking.

Referring to FIG. 1D, liquid crystal window 100" can further comprise third and/or fourth substrates 103, 104. Third substrate 103 comprises a first surface 103A and a second surface 103B. Fourth substrate 104 comprises a first surface 104A and a second surface 104B. First and third substrates 101, 103 can define a first cell gap 111, which can be sealed with seals s2 and may contain at least one insulating gas. Similarly, second and fourth substrates 102, 104 can define a second cell gap 112, which can be sealed with seals s2 and may contain at least one insulating gas.

Cell gaps 111, 112 can be filled with air, an inert gas, or a mixture thereof. Suitable inert gases include, but are not limited to, argon, krypton, xenon, and combinations thereof. Mixtures of inert gases or mixtures of one or more inert gases with air can also be used. Exemplary non-limiting inert gas mixtures include 90/10 or 95/5 argon/air, 95/5 krypton/air, or 22/66/12 argon/krypton/air mixtures. Other ratios of inert gases or inert gases and air can also be used depending on the desired thermal performance and/or end use of the liquid crystal window.

Although FIG. 1D depicts a liquid crystal window 100" comprising both a third and a fourth substrate, it is possible for the liquid crystal window 100" to comprise only one of such substrates, for instance, a first and third substrates 101, 103 can define first cell gap 111 and a fourth substrate may not be present. Alternatively, second and fourth substrates 102, 104 can define second cell gap 112 and the third substrate may not be present. The liquid crystal window 100" depicted in FIG. 1D may be advantageous from a thermal efficiency standpoint as the insulating gas present in the first and/or second cell gaps 111, 112 can reduce thermal transfer across the window layers and thus improve the overall thermal rating of the window 100".

The liquid crystal devices disclosed herein can, in some embodiments, include more than one switchable layer, such as an additional liquid crystal layer or an electrochromic layer, or both. For instance, referring to FIG. 2A, liquid crystal window 200 can further include an interstitial substrate 105 disposed between the first and second glass substrates 101, 102. The interstitial substrate 105 may comprise glass, similar to the first and second substrates 101, 102, or may comprise any other suitable transparent material, such as plastic. While FIG. 2A depicts a single cell configuration with an interstitial substrate, it is also possible to use a traditional double cell configuration, e.g., two side-by-side single cells, such as the single cells depicted in FIG. 1A or FIG. 1B.

Liquid crystal window 200 can include cholesteric liquid crystal layer 110, which is disposed between the first glass substrate 101 and the interstitial substrate 105, and a second (or additional) liquid crystal layer 115, which is disposed between the second glass substrate 102 and the interstitial substrate 105. The second liquid crystal layer 115 can comprise a cholesteric liquid crystal material or can comprise any other type of liquid crystal material, as discussed in more detail below. Second liquid crystal layer may also be doped with a dye and/or may include one or two polarizers.

First and second electrodes 106, 107 can be used to apply voltage to the cholesteric liquid crystal layer 110. Third and fourth electrodes 113, 114 can be used to apply voltage to second liquid crystal layer 115. While FIG. 2A illustrates liquid crystal layers 110, 115 disposed between first and second electrodes 106, 107 and third and fourth electrodes 113, 114, respectively, it is also possible to replace these electrodes with interdigitated electrodes, e.g., as illustrated in FIG. 1B.

FIG. 2B illustrates an alternative configuration for a liquid crystal window 200'. Similar to liquid crystal window 200 of FIG. 2A, liquid crystal window 200' includes a first substrate 101, a second substrate 102, an interstitial substrate 105, and a cholesteric liquid crystal layer 110. In the depicted embodiment, electrochromic layer 120 is present between the second substrate 102 and the interstitial substrate 105, rather than a second liquid crystal layer. Of course, the depicted configuration is not limiting and the electrochromic layer 120 can be inserted in other locations within window 200', such as between the first substrate 101 and the interstitial substrate 105 (and correspondingly positioning the cholesteric liquid crystal layer 110 between the second substrate 102 and the interstitial substrate 105). Electrochromic layer 120 can be controlled by third and fourth electrodes 113, 114 to vary the degree of light transmittance through this layer.

Combining the cholesteric liquid crystal layer with an additional switchable layer, e.g., using the non-limiting configurations depicted in FIGS. 2A-B, can provide the liquid crystal window with additional operational modes. For example, if the cholesteric liquid crystal layer is in a stable planar state (high transmittance, e.g., >80%) and the additional switchable layer is in a transparent state, the combined layers can provide a transparent mode for the liquid crystal window. When the cholesteric liquid crystal layer is in a stable planar state (high transmittance, e.g., >80%) and the additional switchable layer is in a grayscale or tinted state, the combined layers can provide a tint mode for the liquid crystal window. When the cholesteric liquid crystal layer is in a focal conic state (high haze, e.g., >90%) and the additional switchable layer is in a transparent state, the combined layers can provide a haze operation mode for the liquid crystal window. When the cholesteric liquid crystal window is in a focal conic state (high haze, e.g., >90%) and the additional switchable layer is in a grayscale or tinted state, the combined layers can provide a tint plus haze mode for the liquid crystal layer.

It is to be understood that the scope of the disclosure is not limited solely to the embodiments depicted in FIGS. 1-2. The liquid crystal windows disclosed herein can comprise additional layers and/or substrates with different configurations or combinations of the depicted embodiments. Various components of liquid crystal devices 100, 100\*, 100', 100", 200, and 200' will now be discussed in more detail.

Materials

Substrates

The following description is intended to apply to any substrates used in the liquid crystal windows disclosed herein, including those discussed above with reference to FIGS. 1-2, e.g., the first, second, third, fourth, and/or interstitial substrates 101, 102, 103, 104, 105, and any other additional substrates, if present. The characteristics and properties of each substrate can be independently selected and can be the same or different from other substrates in the liquid crystal window.

According to non-limiting embodiments, at least one of the substrates in the liquid crystal window can comprise an optically transparent material. As used herein, the term "optically transparent" is intended to denote that the component and/or layer has a transmission of greater than about 80% in the visible region of the spectrum (~400-700 nm). For instance, an exemplary component or layer may have greater than about 85% transmittance in the visible light range, such as greater than about 90%, or greater than about 92%, including all ranges and subranges therebetween. In certain embodiments, all of the substrates in the liquid crystal window can comprise an optically transparent material.

According to various embodiments, all or some of the substrates in the liquid crystal window can comprise glass sheets. The substrates can have any shape and/or size, such as a rectangle, square, or any other suitable shape, including regular and irregular shapes and shapes with one or more curvilinear edges. According to various embodiments, the substrates can have a thickness of less than or equal to about 4 mm, for example, ranging from about 0.1 mm to about 4 mm, from about 0.2 mm to about 3 mm, from about 0.3 mm to about 2 mm, from about 0.5 mm to about 1.5 mm, or from about 0.7 mm to about 1 mm, including all ranges and subranges therebetween. In certain embodiments, the substrates can have a thickness of less than or equal to 0.5 mm, such as 0.4 mm, 0.3 mm, 0.2 mm, 0.1 mm, 0.05 mm, or 0.01 mm, including all ranges and subranges therebetween. In non-limiting embodiments, the substrates can have a thickness ranging from about 1 mm to about 3 mm, such as from about 1.5 to about 2 mm, including all ranges and subranges therebetween. The substrates in the liquid crystal window may, in some embodiments, comprise the same thickness, or may have different thicknesses.

In various embodiments, the substrates can comprise any glass known in the art, for example, soda-lime silicate, aluminosilicate, alkali-aluminosilicate, borosilicate, alkali-borosilicate, aluminoborosilicate, alkali-aluminoborosilicate, and other suitable display glasses. The substrates may, in some embodiments, comprise the same glass, or may comprise different glasses. The glass substrates may, in various embodiments, be chemically strengthened and/or thermally tempered. Non-limiting examples of suitable commercially available glasses include EAGLE XG®, Lotus™, Willow®, and Gorilla® glasses from Corning Incorporated, to name a few. Chemically strengthened glass, for example, may be provided in accordance with U.S. Pat. Nos. 7,666,511, 4,483,700, and 5,674,790, which are incorporated herein by reference in their entireties.

According to additional embodiments, one or more of the substrates can comprise a low emissivity or Low-E glass. Low-E glasses have a coating that can minimize the amount of infrared (IR) and/or ultraviolet (UV) light that passes through the glass, such as Thinsulate™ available from 3M and other similar coatings. The UV and/or IR transmittance of a Low-E glass can be less than about 5%, such as less than 2%, less than 1%, less than 0.5%, or less than 0.1%, including all ranges and subranges therebetween. The Low-E glass can minimize UV and/or IR light transmission without impacting the transmission of visible light through the glass. For example, referring to FIG. 1C or FIG. 1D, the third substrate 103 can comprise a Low-E glass that provides UV and/or IR protection for the first substrate 101 and any underlying liquid crystal layer(s). Similarly, the fourth substrate 104 can comprise a Low-E glass that provides UV and/or IR protection for the second substrate 102 and any underlying liquid crystal layer(s). When Low-E glass is included in the liquid crystal window, it may be oriented to face the exterior, e.g., the outside of a building or vehicle, to protect the liquid crystal window from undesired incoming radiation. For example, referring to FIG. 1C, if the fourth substrate 104 faces the exterior, e.g., outside of a building or vehicle, the fourth substrate 104 may comprise Low-E glass to protect the liquid crystal window components from UV and/or IR radiation, whereas the remaining glass substrates 101, 102, 103 may not comprise Low-E glass. Similarly, if the third substrate 103 faces the exterior, the third substrate 103 may comprise Low-E glass whereas the remaining substrates 101, 102, 104 need not comprise Low-E glass.

According to various embodiments, the glass substrates may be chosen from glass sheets produced by a fusion draw process. Without wishing to be bound by theory, it is believed that the fusion draw process can provide glass sheets with a relatively low degree of waviness (or high degree of flatness), which may be beneficial for various liquid crystal applications. An exemplary glass substrate may thus, in certain embodiments, comprise a surface waviness of less than about 100 nm as measured with a contact profilometer, such as about 80 nm or less, about 50 nm or less, about 40 nm or less, or about 30 nm or less, including all ranges and subranges therebetween. An exemplary standard technique for measuring waviness (0.8-8 mm) with a contact profilometer is outlined in SEMI D15-1296 "FPD Glass Substrate Surface Waviness Measurement Method." With reference to FIGS. 1-2, at least one of the first and second surfaces 101A, 101B of first glass substrate 101 and/or at least one of the first and second surfaces 102A, 102B of second glass substrates 102 can, in some embodiments, comprise a surface waviness as described above, e.g., of less than about 100 nm. Similarly, at least one of the surfaces of the third, fourth, and/or interstitial substrates 103, 104, 105 can, in non-limiting embodiments, also comprise a surface waviness of less than about 100 nm.

The interstitial substrate 105, if present, as well as any other interstitial substrates that might be present in the liquid crystal window, can comprise a glass material as discussed above. According to other embodiments, the interstitial substrate(s) may comprise a material other than glass, such as plastics. Suitable plastic materials include, but are not limited to, polycarbonates, polyacrylates such as polymethylmethacrylate (PMMA), and polyethyelenes such as polyethylene terephthalate (PET).

Electrodes

The liquid crystal windows disclosed herein can comprise at least one electrode pair, e.g., first and second electrodes 106, 107, interdigitated electrode pair 116*, and/or second and third electrodes 113, 114. Additional electrodes may be present depending on the window configuration and the number of switchable layers. The characteristics and properties of each electrode can be independently selected and can be the same or different from other electrodes in the liquid crystal window.

Electrode layers in the liquid crystal window may comprise one or more transparent conductive oxides (TCOs), such as indium tin oxide (ITO), indium zinc oxide (IZO), gallium zinc oxide (GZO), aluminum zinc oxide (AZO), and other like materials. Alternatively, the electrode layers may comprise other transparent materials, such as a conductive mesh, e.g., comprising metals such as silver nanowires or other nanomaterials such as graphene or carbon nanotubes. Printable conductive ink layers such as ActiveGrid™ from C3Nano Inc. may also be used. According to various embodiments, the sheet resistance of the electrode layers can range from about 10Ω/□ (ohms/square) to about 1000Ω/□, such as from about 50Ω/□ to about 900Ω/□, from about 100Ω/□ to about 800Ω/□, from about 200Ω/□ to about 700Ω/□, from about 300Ω/□ to about 600Ω/□, or from about 400Ω/□ to about 500Ω/□, including all ranges and subranges therebetween.

Electrodes can be fabricated using any technique known in the art, such as vacuum sputtering, film lamination, or printing techniques. Electrodes can be deposited on one or more substrate surfaces to form a layer of material that may or may not comprise a pattern. The thickness of each electrode layer can, for example, independently range from about 1 nm to about 1000 nm such as from about 5 nm to about 500 nm, from about 10 nm to about 300 nm, from about 20 nm to about 200 nm, from about 30 nm to about 150 nm, or from about 50 nm to about 100 nm, including all ranges and subranges therebetween.

Liquid Crystal Layers

Liquid crystal windows disclosed herein can include at least one liquid crystal layer, such as cholesteric liquid crystal layer 110 and second liquid crystal layer 115, as well as any other additional liquid crystal layers that might be present in the window. The characteristics and properties of each liquid crystal layer can be independently selected and can be the same or different from other liquid crystal layers in the liquid crystal window.

The orientation of liquid crystal material can be described by a unit vector, referred to herein as a "director," which represents the average local orientation of the long molecular axes of the liquid crystal molecules. A vertical alignment or homeotropic state is achieved when the liquid crystal director has a perpendicular or substantially perpendicular orientation with respect to the plane of the substrate. A planar alignment or homogeneous state is achieved when the liquid crystal director has a parallel or substantially parallel orientation with respect to the plane of the substrate. An oblique alignment or grayscale state is achieved when the liquid crystal direction has a large angle with respect to the plane of the substrate, which is substantially different from planar or homeotropic, i.e., ranging from about 20° to about 70°, such as from about 30° to about 60°, or from about 40° to about 50°, including all ranges and subranges therebetween.

According to various embodiments, the liquid crystal layer(s) in the window disclosed herein can comprise a cell gap or cavity filled with liquid crystal material. The thickness of the liquid crystal layer, or the cell gap distance, can be maintained by particle spacers and/or columnar spacers dispersed in the liquid crystal layer. The liquid crystal layers can have a thickness of less than or equal to about 0.2 mm, for example, ranging from about 0.001 mm to about 0.1 mm, from about 0.002 mm to about 0.05 mm, from about 0.003 mm to about 0.04 mm, from about 0.004 mm to about 0.03 mm, from about 0.005 mm to about 0.02 mm, or from about 0.01 mm to about 0.015 mm, including all ranges and subranges therebetween. If more than one liquid crystal layer is present in the window, these layers may comprise the same thickness or may have different thicknesses.

A liquid crystal layer can comprise liquid crystals and one or more additional components, such as dyes or other coloring agents, chiral dopants, polymerizable reactive monomers, photoinitiators, polymerized structures, or any combination thereof. Liquid crystals can have any liquid crystal phase, such as achiral nematic liquid crystal (NLC), chiral nematic liquid crystal or cholesteric liquid crystal (CLC), or smectic liquid crystal, which are operable over a broad range of temperatures, such as from about −40° C. to about 100° C.

In some embodiments, dyes or other coloring agents, such as dichroic dyes, can be added to a liquid crystal layer to absorb light transmitted through the liquid crystal layer(s). Dichroic dyes typically absorb light more strongly along a direction parallel to the direction of a transition dipole moment in the dye molecule, which is typically the longer molecular axis of the dye molecule. Dye molecules oriented with their long axis perpendicular to the direction of light polarization will provide low light attenuation, whereas dye molecules oriented with their long axis parallel to the direction of light polarization will provide strong light attenuation.

In the case of cholesteric liquid crystal layers (CLC), such as cholesteric liquid crystal layer 110, one or more chiral dopants may be added to the liquid crystal mixture to achieve a twisted supramolecular structure of liquid crystal molecules, which may have a random alignment that provides light scattering or haze effects, referred to herein as a focal conic texture. Non-limiting examples of chiral dopants include R811, S811, R1011, S1011, R5011, and S5011 available from Merck. In some embodiments, the chiral dopant can include pairs of enantiomers. Random liquid crystal alignment can also be promoted or assisted by including polymer structures, such as polymer fibers, in the matrix of the liquid crystal layer, referred to herein as polymer stabilized cholesteric texture (PSCT).

The amount of twist in the CLC is described by a helical pitch which represents the rotation angle of a local liquid crystal director by 360 degrees across the cell gap thickness. CLC twist can also be quantified by a ratio (d/p) of cell gap thickness (d) to CLC helical pitch (p). For liquid crystal applications, the amount of chiral dopant dissolved in the liquid crystal mixture can be controlled to achieve a desired amount of twist across a given cell gap distance. It is within the ability of one skilled in the art to select the appropriate dopant and its amount to achieve the desired twisted effect. The pitch of the liquid crystal determines the wavelengths of light that are reflected by the liquid crystal. The range of reflected wavelengths (R) is defined by $p*n_0 < R < p*n_e$, where $n_e > n_0$ and $n_e$ is the extraordinary refractive index and $n_0$ is the ordinary refractive index of the liquid crystal. Exemplary cholesteric liquid crystals may have an ordinary refractive index of about 1.5 or less and an extraordinary refractive index of about 1.6 or greater, such as from about 1.6 to about 1.8.

In various embodiments, the cholesteric liquid crystal layer 110 may have an amount of twist ranging from about 0° to about 25×360° (or d/p ranging from about 0 to about 25.0), for example, ranging from about 45° to about 1080° (d/p from about 0.125 to about 3), from about 90° to about 720° (d/p from about 0.25 to about 2), from about 180° to about 540° (d/p from about 0.5 to about 1.5), or from about 270° to about 360° (d/p from about 0.5 to about 1), including all ranges and subranges therebetween. A liquid crystal that includes a chiral dopant and has a small pitch and a large twist refers to a CLC mixture wherein d/p is greater than 1. A liquid crystal that includes a chiral dopant and has a large pitch and a small twist refers to a CLC mixture wherein d/p is less than or equal to 1.

Non-limiting examples of cholesteric liquid crystals include the E-series and BL-series liquid crystals, such as E7, E44, E48 BL003, BL006, and BL038 cholesteric liquid crystals, available from Merck. In some embodiments, the liquid crystal layer can include a cyano-biphenyl material, a cyano-terphenyl material, or mixtures thereof. In various embodiments, the liquid crystal layer can include only one type of liquid crystal material. In other embodiments, the liquid crystal layer can include a plurality of liquid crystal materials, such as two, three, four, five, or more liquid crystal materials. In certain embodiments, the liquid crystal layer can include a first liquid crystal material and a second liquid crystal material. The ratio (by weight) of the first liquid crystal material to the second liquid crystal material may be in the range of about 1:99 to about 99:1, including from about 10:90 to about 90:10, about 20:80 to about 80:20, about 70:30 to about 30:70, about 40:60 to about 60:40, about 45:55 to about 55:45, or about 50:50, including all ranges and subranges therebetween.

Alignment Layers

Specific alignment of a liquid crystal layer can, in some embodiments, be improved by coating one or more surfaces of the substrates and/or electrodes with an alignment layer. Alignment layers can comprise a thin film of material having a surface energy and anisotropy promoting the desired orientation for the liquid crystals in direct contact with its surface. Exemplary materials include, but are not limited to, main chain or side chain polyimides, which can be mechanically rubbed to generate layer anisotropy; photosensitive polymers, such as azobenzene-based compounds, which can be exposed to linearly polarized light to generate surface anisotropy; and inorganic thin films, such as silica, which can be deposited using thermal evaporating techniques to form periodic microstructures on the surface. Organic alignment layers promoting vertical or homeotropic orientation of the liquid crystal molecules may be rubbed to create different pretilt angles other than 90° with respect to the plane of the substrate. The pretilt angle of the liquid crystal molecules with respect to the substrate surface will break the symmetry during switching from vertical orientation and can define an azimuthal direction of liquid crystal switching.

Organic alignment layers may be deposited, for example, by spincoating a solution onto a desired surface or using printing techniques. Inorganic alignment layers can be deposited using thermal evaporation techniques. Any alignment layer(s) present in the liquid crystal window can have, for example, a thickness of less than or equal to about 100 nm, for example, ranging from about 1 nm to about 100 nm, from about 5 nm to about 90 nm, from about 10 nm to about 80 nm, from about 20 nm to about 70 nm, from about 30 nm to about 60 nm, or from about 40 nm to about 50 nm, including all ranges and subranges therebetween.

Interlayers

Liquid crystal windows disclosed herein can include at least one interlayer, for example, if third and/or fourth substrates are present, e.g., as shown in FIG. 1C, interlayers may be present between the first substrate 101 and the third substrate 103 and/or between the second substrate 102 and the fourth substrate 104. Interlayers can comprise, in some embodiments, one or more materials chosen from polyvinyl butyral (PVB), polylactic acid, polyurethanes, SentryGlas® and SentryGlas® Plus from DuPont, and other suitable materials.

The interlayers, if present, can improve the safety of the liquid crystal window, e.g., by holding one or more glass substrates in place in case of breakage. For example, referring to FIG. 1C, first interlayer 108 can hold the third glass substrate 103 in place in case of breakage and/or second interlayer 109 can hold the fourth glass substrate 104 in place in case of breakage. Other advantages can also include UV and/or IR protection for the first and/or second substrates and underlying liquid crystal layer(s). According to various embodiments, the UV and/or IR transmittance of the interlayers can be less than 5%, such as less than 2%, less than 1%, less than 0.5%, or less than 0.1%, including all ranges and subranges therebetween. If more than one interlayer is present, they may have the same UV and/or IR transmittance, or different transmittances. For example, referring to FIG. 1C, if the fourth substrate 104 faces the exterior, e.g., outside of a building or vehicle, the second interlayer 109 may have a lower UV and/or IR transmittance to protect the remaining liquid crystal window components from UV and/or IR radiation, whereas the first interlayer 108 may have a higher UV and/or IR transmittance because it faces the interior. Similarly, if the third substrate 103 faces the exterior, the first interlayer 108 may have a lower UV and/or IR transmittance.

Electrochromic Layer

Any suitable electrochromic material can be used in electrochromic layer 120 including lithium ions, electrochromic dyes, and nanocrystals, to name a few. The electrochromic material may undergo chemical and/or physical changes upon application of voltage that affect the attenuation of light. For instance, lithium ions may migrate from the third electrode (e.g., comprising $LiCoO_2$) to the fourth electrode (e.g., comprising $WO_3$) through a separator upon application of voltage. Interactions of the lithium ions with the fourth electrode can cause it to reflect light, which may effectively turn the electrode dark/opaque. The lithium ions will remain in that position until the voltage is reversed, causing them to move back to the third electrode and to revert to a bright/clear state. Electrochromic dyes can change colors upon application of voltage, thereby varying the attenuation of light between on and off states. Nanocrystals can similarly allow more or less light to pass through the electrochromic layer depending on the applied voltage. It is also possible to use other electrochromic materials, coatings, and/or assemblies in electrochromic layer 120 without limitation.

The liquid crystal windows disclosed herein can be used in various architectural and transportation applications. For example, the liquid crystal devices can be used as liquid crystal windows that can be included in doors, space partitions, skylights, and windows for buildings, automobiles, and other transportation vehicles such as trains, planes, motorhomes, boats, and the like. Liquid crystal window devices for use in architectural applications can have any desired dimension including, but not limited to 2'×4' (width× height), 3'×5', 5'×8', 6'×8', 7×10', 7'×12'. Larger and smaller liquid crystal windows are also envisioned and are intended to fall within the scope of this disclosure. Although not illustrated, it is to be understood that the liquid crystal windows disclosed herein can comprise one or more additional components such as a frame or other structural component, a power source, and/or a control device or system.

Methods

Embodiments of the disclosure will now be discussed with reference to FIGS. 3-9, which illustrate various methods and conditions for operating the liquid crystal windows disclosed herein. The following general description is intended to provide an overview of the claimed methods, and various aspects will be more specifically discussed throughout the disclosure with reference to the non-limiting depicted embodiments, these embodiments being interchangeable with one another within the context of the disclosure.

The multi-stable liquid crystal windows disclosed herein can have three or more stable states and can be switched between any of these stable states using pulsed voltage. Once voltage is applied to achieve a desired stable state, voltage need not continue to be applied to maintain that state. As used herein, a "stable" state is intended to indicate that the liquid crystal window is able to maintain the state without continuous application of voltage for a time period of at least 1 hour. According to various embodiments, the stable state can be maintained without application of voltage for at least 2 hours, at least 3 hours, at least 4 hours, at least 6 hours, at least 8 hours, at least 10 hours, at least 12 hours, at least 16 hours, at least 20 hours, or at least 24 hours, or more, including all ranges and subranges therebetween.

FIGS. 3-8 illustrate schematics for switching a liquid crystal window between first stable state S1, second stable state S2, and third stable state S3, via homeotropic state S0. Each illustrated transition can be carried out by a sequence of voltage pulses, for example, a two-pulse sequence as illustrated in FIGS. 3A, 4A, 5A, 6A, 7A, and 8A, or a three-pulse sequence as illustrated in FIGS. 3B, 4B, 5B, 6B, 7B, and 8B. A two-pulse sequence may be useful when switching a window comprising a single pixel, e.g., the entire window responds to the pulse sequence and switches to the desired state. A three-pulse sequence may be advantageous if a window is subdivided into multiple pixels, for example, a matrix of subpixels comprising two or more subpixels, three or more, four or more, and so forth. In such an instance, the first and third pulses can be uniformly applied to all subpixels, whereas different second pulses can be applied to each subpixel to achieve different desired stable states for each subpixel.

The homeotropic state S0 has a transmittance T0 and a haze H0. Homeotropic state S0 is not a stable state without applied voltage. Over a short period of time, e.g., less than 5 seconds, less than 4 seconds, less than 3 seconds, less than 2 seconds, or less than 1 second, at zero or nearly zero voltage, the liquid crystal will transition back into stable state S1 from homeotropic state S0.

First stable state S1 has a first transmittance T1 and a first haze H1. The first stable state is referred to herein as a planar state or planar texture. The pitch of the cholesteric liquid crystals in the first stable state S1 results in reflection of light with wavelengths longer than 700 nm and transmission of visible light having wavelengths between about 400 nm to about 700 nm.

According to various embodiments, the first stable state S1 is a transparent or transmissive state, having a first transmittance T1 is greater than about 80%, such as greater than about 82%, greater than about 85%, greater than about 88%, or greater than about 90%, including all ranges and subranges therebetween. In additional embodiments, the first haze H1 is less than or equal to about 5%, such as less than about 4%, less than about 3%, less than about 2%, or less than about 1%, including all ranges and subranges therebetween.

Second stable state S2 has a second transmittance T2 and a second haze H2. The second stable state is referred to herein as a focal conic state or focal conic texture. The thickness of the cholesteric liquid crystal results in the scattering of visible light having wavelengths between about 400 nm to about 700 nm. For instance, the thickness of the cholesteric liquid crystal layer may be greater than about 10 μm, greater than about 15 μm, such as greater than about 20 μm, greater than about 25 μm, or greater than about 30 μm, including all ranges and subranges therebetween. According to various embodiments, the second stable state is an opaque state, having a second transmittance T2 of less than about 3%, such as less than about 2%, or less than about 1%, including all ranges and subranges therebetween. In additional embodiments, the second haze H2 is greater than or equal to about 90%, such as greater than about 92%, greater than about 95%, greater than about 98%, or greater than about 99%, including all ranges and subranges therebetween.

Third stable state S3 has a third transmittance T3 and a third haze H3. The third stable state is referred to herein as a grayscale state or a grayscale texture. The pitch of the cholesteric liquid crystals in the third stable state S3 results in partial transmission of visible light having wavelengths between about 400 nm to about 700 nm. In a grayscale state, the cholesteric liquid crystals are in a multiple-domain state, e.g., some crystals are in planar or nearly planar state whereas other crystals are in focal conic or nearly focal conic state. Some light will be transmitted through the planar or nearly planar areas whereas light will be scattered by the focal conic or nearly focal conic areas of the liquid crystal. The individual areas are relatively small, e.g., from about 0.1×0.1 mm$^2$ to about 0.5×0.5 mm$^2$, and thus the overall liquid crystal window is perceived by the human eye as being in a grayscale state. According to various embodiments, the third transmittance T3 is between first and second transmittances T1, T2 and may satisfy the condition: T1>T3>T2. In certain embodiments, the third transmittance T3 may satisfy the condition: T3=(T1+T2)/2. For instance, the third transmittance may range from about 4% to about 75%, such as from about 5% to about 70%, from about 10% to about 60%, from about 20% to about 50%, or from about 30% to about 40%, including all ranges and subranges therebetween. Similarly, the third haze H3 can be between the first and second hazes H1, H2 and may satisfy the condition: H1<H3<H2. In certain embodiments, the third transmittance T3 may satisfy the condition: H3=(H1+H2)/2. For instance, the third haze H3 can range from about 10% to about 80%, such as from about 20% to about 70%, from about 30% to about 60%, or from about 40% to about 50%, including all ranges and subranges therebetween.

While not illustrated in FIGS. 3-8, it is possible to have more than one stable grayscale state, for example stable states S4, S5, and so forth. An exemplary and non-limiting fourth stable state S4 can have a fourth transmittance T4 and a fourth haze H4. The fourth stable state, similar to the third stable state, can be a grayscale state having a partial transmission of visible light having wavelengths between about 400 nm to about 700 nm. According to various embodiments, fourth third transmittance T4 is between first and second transmittances T1, T2 and may satisfy the conditions: T1>T3>T4>T2 or T1 T4>T3>T2. For instance, the fourth transmittance may range from about 4% to about 75%, such as from about 5% to about 70%, from about 10% to about 60%, from about 20% to about 50%, or from about 30% to about 40%, including all ranges and subranges therebetween. Similarly, the fourth haze H4 can be between the first and second hazes H1. H2 and may satisfy the conditions: H1<H3<H4<H2 or H1<H4<H3<H2. For instance, the fourth haze H4 can range from about 10% to about 80%, such as from about 20% to about 70%, from about 30% to about 60%, or from about 40% to about 50%, including all ranges and subranges therebetween.

For each of stable states S1, S2, S3, S4, etc. described above, it should be noted that transmittance T1, T2, T3, T4 and haze H1, H2, H3, H4 are defined as being measured through a liquid crystal window comprising the first glass substrate, second glass substrate, electrode pair, and cholesteric liquid crystal layer. If additional substrates are added to the liquid crystal window, such as third and/or fourth glass substrates, the transmittance and haze values may vary depending on the configuration, materials, etc.

Figure 3A:
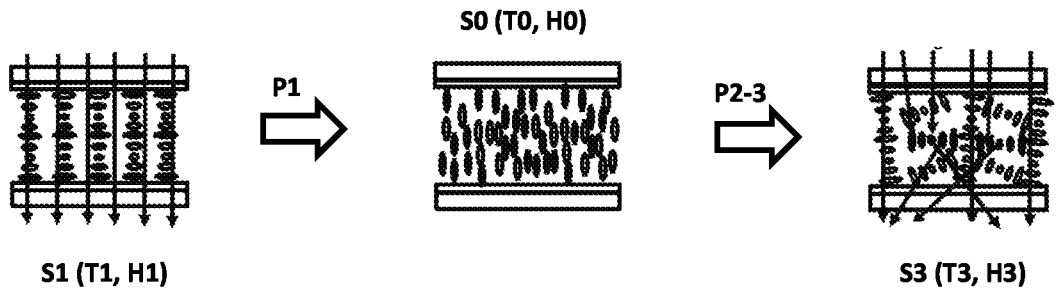
FIG. 3A is a schematic depicting a liquid crystal window switching from a first stable state to a third stable state using a two-pulse voltage sequence.

FIG. 3A illustrates a liquid crystal window transitioning from the first stable state S1 to the third stable state S3 via homeotropic state S0 using a two-pulse (P1, P2) voltage sequence. The two-pulse voltage sequence is illustrated in FIG. 3C. A first voltage pulse P1 is applied to transition the liquid crystal window from the first stable state S1 into homeotropic state S0. The first voltage pulse may, for example, have a root mean square (RMS) voltage V1, a duration t1, and a frequency f1. The second voltage pulse P2-3 is then applied to transition the liquid crystal window from the homeotropic state S0 into the third stable state S3. The second voltage pulse may, for example, have a RMS voltage V2-3, a duration t2-3, and a frequency f2-3.

Figure 4A:
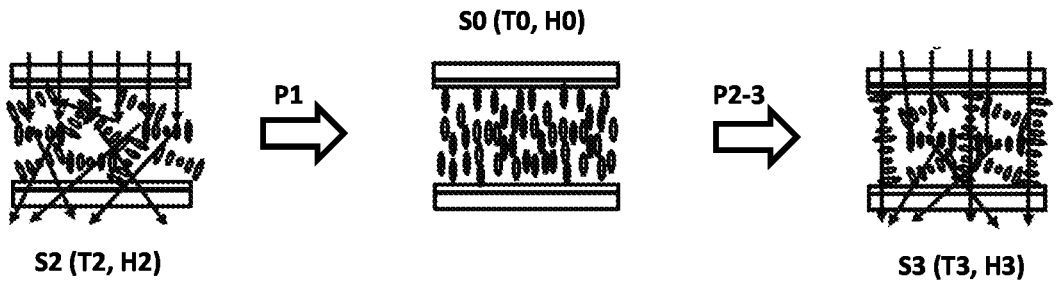
FIG. 4A is a schematic depicting a liquid crystal window switching from a second stable state to a third stable state using a two-pulse voltage sequence.

FIG. 4A illustrates a liquid crystal window transitioning from the second stable state S2 to the third stable state S3 via homeotropic state S0 using a two-pulse (P1, P2) voltage sequence. The two-pulse voltage sequence is illustrated in FIG. 4C. A first voltage pulse P1 is applied to transition the liquid crystal window from the second stable state S2 to the homeotropic state S0. The first voltage pulse may, for example, have a RMS voltage V1, a duration t1, and a frequency f1. The second voltage pulse P2-3 is then applied to transition the liquid crystal window from the homeotropic state S0 into the third stable state 83. The second voltage pulse may, for example, have a RMS voltage V2-3, a duration t2-3, and a frequency f2-3.

Figure 5A:
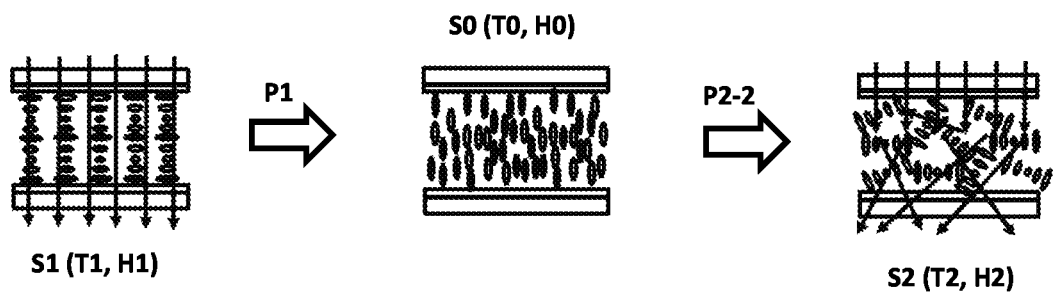
FIG. 5A is a schematic depicting a liquid crystal window switching from a first stable state to a second stable state using a two-pulse voltage sequence.

FIG. 5A illustrates a liquid crystal window transitioning from the first stable state S1 to the second stable state S2 via homeotropic state S0 using a two-pulse (P1, P2) voltage sequence. The two-pulse voltage sequence is illustrated in FIG. 5C. A first voltage pulse P1 is applied to transition the liquid crystal window from the first stable state S1 into homeotropic state S0. The first voltage pulse may, for example, have a RMS voltage V1, a duration t1, and a frequency f1 The second voltage pulse P2-2 is then applied to transition the liquid crystal window from the homeotropic state S0 into the second stable state S2. The second voltage pulse may, for example, have a RMS voltage V2-2, a duration t2-2, and a frequency f2-2.

Figure 6A:
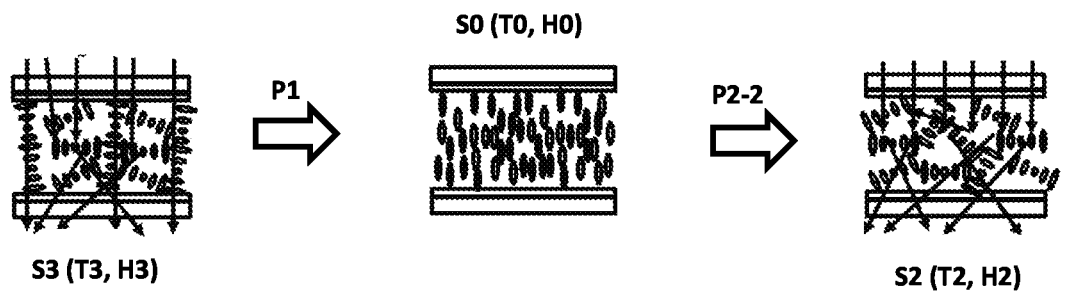
FIG. 6A is a schematic depicting a liquid crystal window switching from a third stable state to a second stable state using a two-pulse voltage sequence.
Figure 6B:
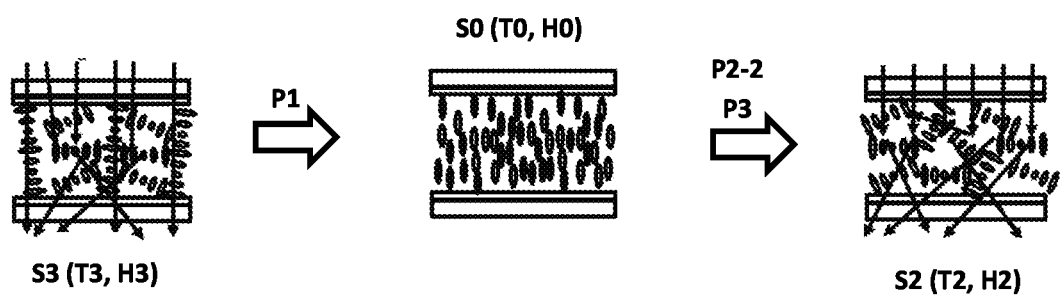
FIG. 6B is a schematic depicting a liquid crystal window switching from a third stable state to a second stable state using a three-pulse voltage sequence.
Figure 6C:
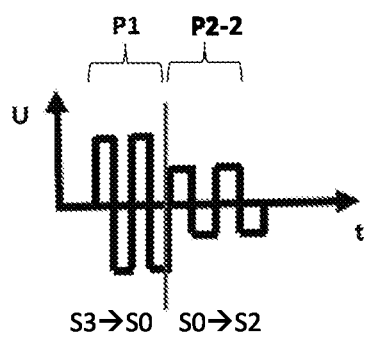
FIG. 6C depicts a two-pulse voltage sequence as a function of time for switching a liquid crystal window from a third stable state to a second stable state according to various embodiments of the disclosure.
Figure 6D:
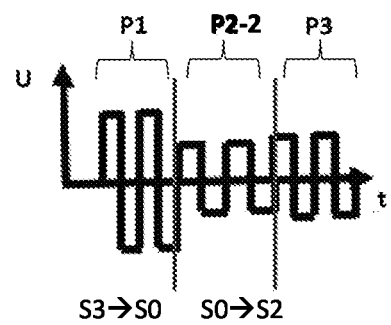
FIG. 6D depicts a three-pulse voltage sequence as a function of time for switching a liquid crystal window from a third stable state to a second stable state according to additional embodiments of the disclosure.

FIG. 6A illustrates a liquid crystal window transitioning from the third stable state S3 to the second stable state S2 via homeotropic state S0 using a two-pulse (P1, P2) voltage sequence. The two-pulse voltage sequence is illustrated in FIG. 6C. A first voltage pulse P1 is applied to transition the liquid crystal window from the third stable state S3 to the homeotropic state S0. The first voltage pulse may, for example, have a RMS voltage V1, a duration t1, and a frequency f1 The second voltage pulse P2-2 is then applied to transition the liquid crystal window from the homeotropic state S0 into the second stable state S2. The second voltage pulse may, for example, have a RMS voltage V2-2, a duration t2-2, and a frequency f2-2.

Figure 7A:
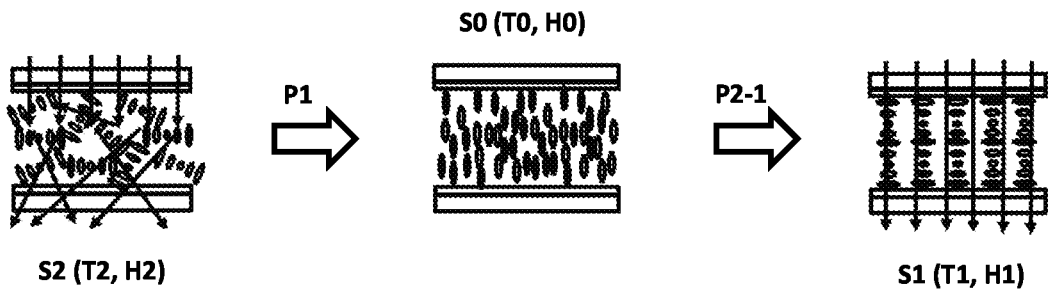
FIG. 7A is a schematic depicting a liquid crystal window switching from a second stable state to a first stable state using a two-pulse voltage sequence.
Figure 7B:
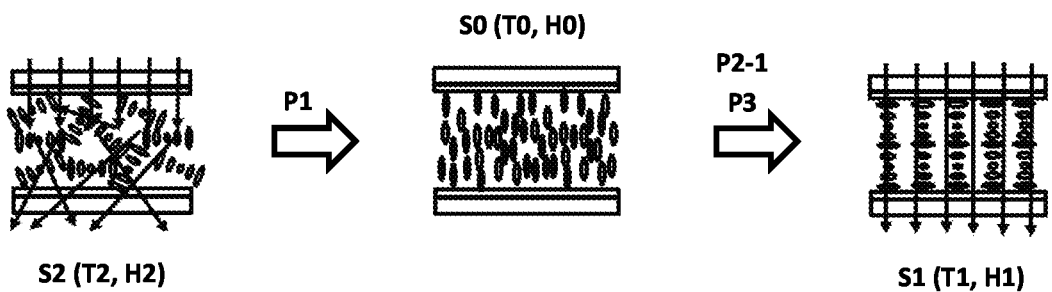
FIG. 7B is a schematic depicting a liquid crystal window switching from a second stable state to a first stable state using a three-pulse voltage sequence.
Figure 7C:
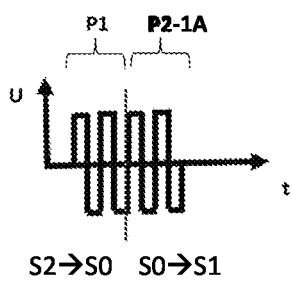
FIG. 7C depicts a two-pulse voltage sequence as a function of time for switching a liquid crystal window from a second stable state to a first stable state according to various embodiments of the disclosure.
Figure 7D:
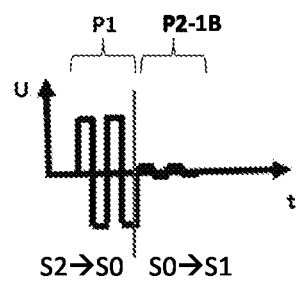
FIG. 7D depicts a three-pulse voltage sequence as a function of time for switching a liquid crystal window from a second stable state to a third stable state according to additional embodiments of the disclosure.

FIG. 7A illustrates a liquid crystal window transitioning from the second stable state S2 to the first stable state S1 via homeotropic state S0 using a two-pulse (P1, P2) voltage sequence. The two-pulse voltage sequences are illustrated in FIGS. 7C-D. A first voltage pulse P1 is applied to transition the liquid crystal window from the second stable state S2 into homeotropic state S0. The first voltage pulse may, for example, have a RMS voltage V1, a duration t1, and a frequency f1. The second voltage pulse P2-1 is then applied to transition the liquid crystal window from the homeotropic state S0 into the first stable state S1. The second voltage pulse may, for example, have a RMS voltage V2-1A, a duration t2-1A, and a frequency f2-1A (as illustrated in FIG. 7C). Alternatively, the second pulse P2-1 may have a RMS voltage V2-1B, a duration t2-1B, and a frequency f2-1B (as illustrated in FIG. 7D). In non-limiting embodiments, the second pulse P2-1 may have a RMS voltage of 0 volts, in which case the window will transition from S0 to S1 over a period of a few seconds in the absence of voltage.

Figure 8A:
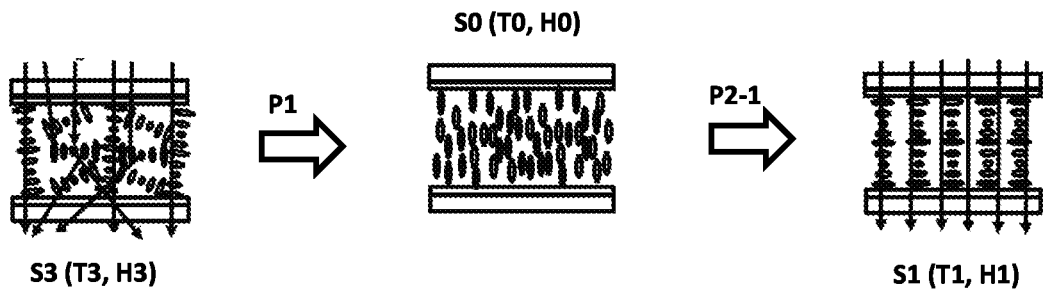
FIG. 8A is a schematic depicting a liquid crystal window switching from a third stable state to a first stable state using a two-pulse voltage sequence.

FIG. 8A illustrates a liquid crystal window transitioning from the third stable state S3 to the first stable state S1 via homeotropic state S0 using a two-pulse (P1, P2) voltage sequence. The two-pulse voltage sequence is illustrated in FIG. 8C. A first voltage pulse P1 is applied to transition the liquid crystal window from the third stable state S3 to the homeotropic state S0. The first voltage pulse may, for example, have a RMS voltage V1, a duration t1, and a frequency f1. The second voltage pulse P2-1 is then applied to transition the liquid crystal window from the homeotropic state S0 into the first stable state S1. The second voltage pulse may, for example, have a RMS voltage V2-1A, a duration t2-1A, and a frequency f2-1A (as illustrated in FIG. 8C). Alternatively, the second pulse P2-1 may have a RMS voltage V2-1B, a duration t2-1B, and a frequency f2-1B (as illustrated in FIG. 8D). In non-limiting embodiments, the second pulse P2-1 may have a RMS voltage of 0 volts.

It should be noted than the voltage pulses described herein are given as root-mean-square RMS voltages (V). The amplitude (A) of a voltage pulse refers to the voltage applied in a single cycle. The duty cycle controls the time duration during which the voltage is set at a particular amplitude while at other time the voltage is set to 0. For a 100% duty cycle the RMS voltage will be equal to the amplitude (V=A). Different RMS voltages can be achieved using pulses of varying amplitude (A) and/or duty cycle. For example, voltage pulses with the same amplitude (A1=A2) can have different RMS voltage values if the duty cycles are different. Voltage pulses with different amplitudes (A1≠A2) can have the same RMS voltages depending on the duty cycle. For example, for first and second voltage pulses with different amplitudes (A1>A2), a 100% duty cycle for both pulses will result in V1=A1, V2=A2, and V1>V2. However, if the duty cycle for the second pulse is 100% then V2=A2 and, if the duty cycle for the first voltage pulse=A2/A1, then V1=A1*(A2/A1)=A2 and thus V1=V2 in this scenario.

For the two-pulse voltage sequences illustrated in FIGS. 3C, 4C, 5C, 6C, 7C, 7D, 8C, and 8D, the first voltage pulse P1 applied to achieve homeotropic state S0 can have the same RMS voltage V1, duration t1, and frequency f1, regardless of the original stable state of the window. The same voltage pulse P1 can be used to transition any of stable states S1, S2, and S3 into homeotropic state S0. The RMS voltage V1 depends on the liquid crystal cell gap, the pitch of the cholesteric liquid crystal, the dielectric anisotropy and viscosity of the cholesteric liquid crystal. By way of a non-limiting example, for a cell gap of 20 μm, the RMS voltage V1 can range from about 80 volts to about 100 volts. The duration t1 can range from about 0.05 seconds to about 0.2 seconds, such as from about 0.075 seconds to about 0.15 seconds, or from about 0.1 seconds to about 0.125 seconds, including all ranges and subranges therebetween. The frequency f1 can range from about 100 Hz to about 10,000 Hz, such as from about 500 Hz to about 9,000 Hz, from about 1,000 Hz to about 8,000 Hz, from about 2,000 Hz to about 7,000 Hz, from about 3,000 Hz to about 6,000 Hz, or from about 4,000 Hz to about 5,000 Hz, including all ranges and subranges therebetween.

Figure 9:
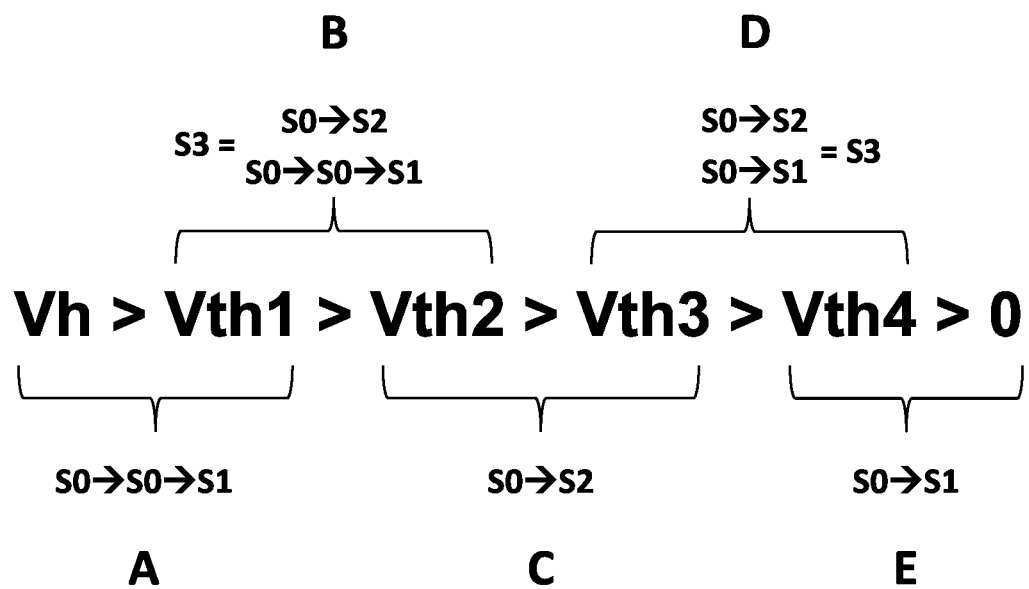
FIG. 9 depicts a formula for threshold voltage conditions for achieving various stable states in a liquid crystal window.

The RMS voltage V1 of first voltage pulse P1 corresponds to a high voltage Vh sufficient to transition the liquid crystal to the homeotropic state S0. Once the first voltage pulse P1 (V1=Vh) is removed, the liquid crystal starts to transition out of homeotropic (unstable) state S0. There are 4 threshold voltages that can be applied in second voltage pulse P2 to transition the liquid crystal at this point, satisfying the condition: Vh>Vth1>Vth2>Vth3>Vth4>0, as illustrated in FIG. 9. Vth1 represents a threshold voltage below which the liquid crystal transitions from S0 to S2. Vth4 represents a threshold voltage below which the liquid crystal transitions from S0 to S1. Vth2 and Vth3 represent transitional thresholds between Vth1 and Vth4 that will result in a mixture of stable states S2/S1, e.g., a grayscale state S3. According to non-limiting embodiments, V1=Vh, Vth1≈0.9*V1, Vth2≈0.7*V1, Vth3≈0.4*V1, and Vth4≈0.1*V1.

The RMS voltage of the second voltage pulse can vary depending on the desired stable state to be achieved, the liquid crystal cell gap, the pitch of the cholesteric liquid crystal, the dielectric anisotropy and viscosity of the cholesteric liquid crystal. Generally speaking, the RMS voltage of the second voltage pulse (V2 is used generically here) can range between Vh and 0 (Vh≥V2≥0) to achieve different stable states, as shown in FIG. 9. In case A, if V2≥Vth1 or Vh≥V2≥Vth1, the liquid crystal will remain in homeotropic state S0 and then transition to planar state S1 over a period of a few seconds or less in the absence of voltage (S0→S0→S1). In case B, if Vth1≥V2≥Vth2, the liquid crystal will transition to grayscale state S3 (because part of the liquid crystal will transition to S2 and part will remain in S0, eventually transitioning to S1 in the absence of voltage, resulting in a S2-S1 multi-domain state or grayscale state S3) (S0→S2+S0→S0→S1=S3). In case C, if Vth2≥V2≥Vth3, the liquid crystal will transition to focal conic state S2 (S0→S2). In case D, if Vth3≥V2≥Vth4, the liquid crystal will transition to grayscale state S3 (because part of the liquid crystal will transition to S2 and part will transition to S1, resulting in a S2-S1 multi-domain state or grayscale state S3) (S0→S2+S0→S1=S3). In case E, if V2≤Vth4, the liquid crystal will transition into planar state S1 (S0→S1).

The different voltage thresholds for second voltage pulse P2 as represented in FIG. 9 will now be discussed in more detail with respect to the embodiments depicted in FIGS. 3-8. Referring to FIGS. 7-8, the second pulse P2-1 applied to achieve stable (planar) state S1 from homeotropic state S0 can have a RMS voltage V2-1A greater than or equal to about Vth1 (the threshold voltage below which the liquid crystal will start transitioning to focal conic state S2). In some instances, Vth1=0.9*V1 or, stated otherwise RMS voltage V2-1A is greater than or equal to about 0.9*V1. For example, RMS voltage V2-1A can satisfy the conditions 0.9*V1≤V2-1A≤V1 or Vth1≤V2-1A≤V1. By way of a non-limiting example, for a cell gap of 20 μm, RMS voltage V2-1A can range from about 72 volts to about 100 volts. This corresponds to Case A in FIG. 9.

In alternative embodiments, the RMS voltage V2-1B can be less than or equal to about Vth4 (the threshold voltage below which the liquid crystal will start transitioning to planar state S1). In some instances, Vth4=0.1*V1 or, stated otherwise RMS voltage V2-1B is less than or equal to about 0.1*V1. For instance, for a cell gap of 20 μm, RMS voltage V2-1B can be less than or equal to about 10 volts, such as from about 0.1 volts to about 9 volts, from about 0.5 volts to about 8 volts, from about 1 volt to about 7 volts, from about 1.5 volts to about 6 volts, from about 2 volts to about 5 volts, or from about 4 volts to about 5 volts, including all ranges and subranges therebetween. RMS voltage V2-1B can also be equal to 0 volts in some embodiments. This corresponds to Case E in FIG. 9.

The second pulse P2-2 applied to achieve stable (focal conical) state S2 from homeotropic state S0 (see FIGS. 5-6) can have a RMS voltage V2-2 less than V1, such as Vth3<V2-2≤Vth2. In some embodiments, for an exemplary liquid crystal window with a 20 μm cell gap, RMS voltage V2-2 can range from about 40 volts to about 70 volts. This corresponds to Case C in FIG. 9.

The second pulse P2-3 applied to achieve stable (grayscale) state S3 from homeotropic state S0 (see FIGS. 3-4) can have a RMS voltage V2-3 that satisfies the condition V2-2<Vth2<V2-3<Vth1, where Vth1=0.9*V1 in some embodiments. Alternatively, RMS voltage V2-3 can satisfy the condition Vth4<V2-3<Vth3<V2-2, where Vth4=0.1*V1 in some embodiments. In some embodiments, for an exemplary cell gap of 20 μm, RMS voltage V2-3 can range from about 10 volts to about 40 volts or from about 70 volts to about 90 volts. These correspond to Cases B and D, respectively, in FIG. 9.

The duration and/or frequency of the second voltage pulse can be the same or can also vary depending on the desired stable state to be achieved. For example, the durations t2-1A, t2-1B, t2-2, and t2-3 can be the same or different and can be independently chosen from a time period ranging from about 0.05 seconds to about 0.2 seconds, such as from about 0.075 seconds to about 0.15 seconds, or from about 0.1 seconds to about 0.125 seconds, including all ranges and subranges therebetween. Similarly, the frequencies 2-1A, f2-1B, f2-2, and f2-3 can be the same or different and can be independently chosen from a frequency ranging from about 100 Hz to about 10,000 Hz, such as from about 500 Hz to about 9,000 Hz, from about 1,000 Hz to about 8,000 Hz, from about 2,000 Hz to about 7,000 Hz, from about 3,000 Hz to about 6,000 Hz, or from about 4,000 Hz to about 5,000 Hz, including all ranges and subranges therebetween.

Figure 3B:
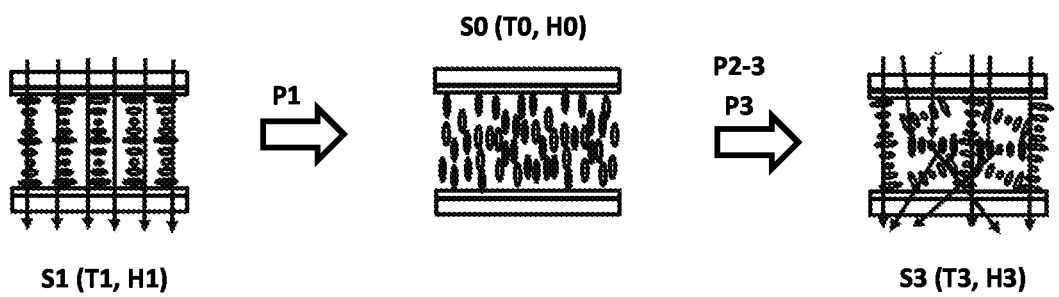
FIG. 3B is a schematic depicting a liquid crystal window switching from a first stable state to a third stable state using a three-pulse voltage sequence.
Figure 3C:
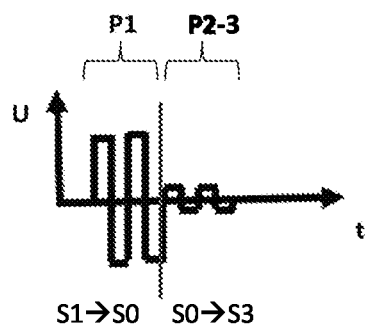
FIG. 3C depicts a two-pulse voltage sequence as a function of time for switching a liquid crystal window from a first stable state to a third stable state according to various embodiments of the disclosure.
Figure 3D:
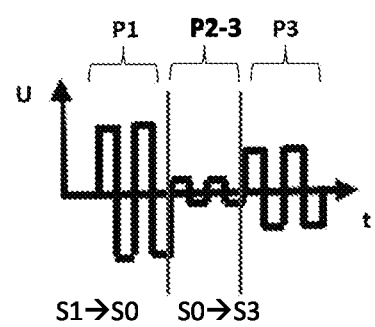
FIG. 3D depicts a three-pulse voltage sequence as a function of time for switching a liquid crystal window from a first stable state to a third stable state according to additional embodiments of the disclosure.

FIG. 3B illustrates a liquid crystal window transitioning from the first stable state S1 to the third stable state 33 via homeotropic state S0 using a three-pulse (P1, P2, P3) voltage sequence. The three-pulse voltage sequence is illustrated in FIG. 3D. A first voltage pulse P1 is applied to transition the liquid crystal window from the first stable state S1 into homeotropic state S0. The first voltage pulse may, for example, have a RMS voltage V1, a duration t1, and a frequency f1. The second voltage pulse P2-3 and third voltage pulse P3 are then applied to transition the liquid crystal window from the homeotropic state S0 into the third stable state 33. The second voltage pulse P2-3 may, for example, have a RMS voltage V2-3, a duration t2-3, and a frequency f2-3. The third voltage pulse V3 can have a RMS voltage V3, a duration t3, and a frequency f3.

Figure 4B:
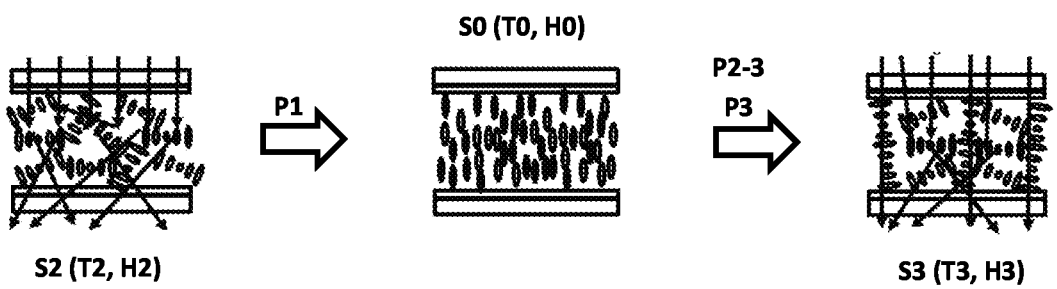
FIG. 4B is a schematic depicting a liquid crystal window switching from a second stable state to a third stable state using a three-pulse voltage sequence.
Figure 4C:
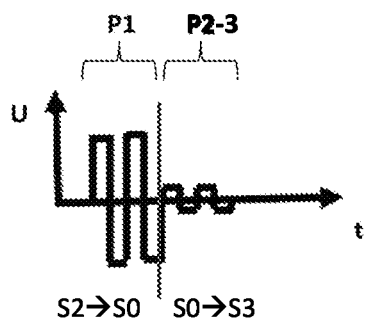
FIG. 4C depicts a two-pulse voltage sequence as a function of time for switching a liquid crystal window from a second stable state to a third stable state according to various embodiments of the disclosure.
Figure 4D:
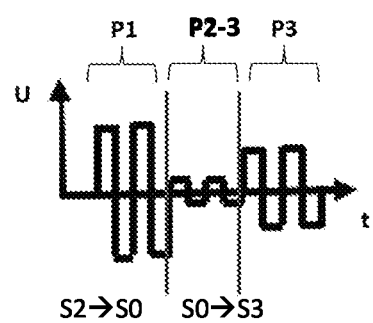
FIG. 4D depicts a three-pulse voltage sequence as a function of time for switching a liquid crystal window from a second stable state to a third stable state according to additional embodiments of the disclosure.

FIG. 4B illustrates a liquid crystal window transitioning from the second stable state S2 to the third stable state 33 via homeotropic state S0 using a three-pulse (P1, P2, P3) voltage sequence. The three-pulse voltage sequence is illustrated in FIG. 4D. A first voltage pulse P1 is applied to transition the liquid crystal window from the second stable state S2 to the homeotropic state S0. The first voltage pulse may, for example, have a RMS voltage V1, a duration t1, and a frequency f1. The second voltage pulse P2-3 and third voltage pulse P3 are then applied to transition the liquid crystal window from the homeotropic state S0 into the third stable state S3. The second voltage P2-3 pulse may, for example, have a RMS voltage V2-3, a duration t2-3, and a frequency f2-3. The third voltage pulse V3 can have a RMS voltage V3, a duration t3, and a frequency f3.

Figure 5B:
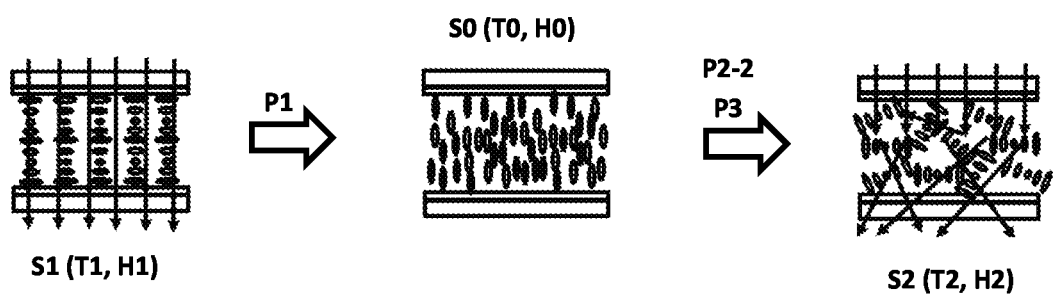
FIG. 5B is a schematic depicting a liquid crystal window switching from a first stable state to a second stable state using a three-pulse voltage sequence.
Figure 5C:
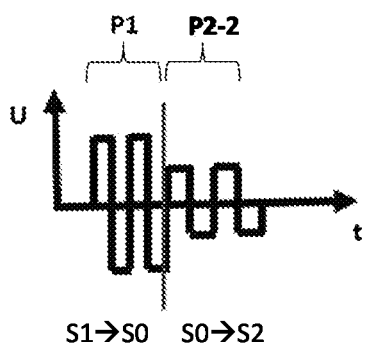
FIG. 5C depicts a two-pulse voltage sequence as a function of time for switching a liquid crystal window from a first stable state to a second stable state according to various embodiments of the disclosure.
Figure 5D:
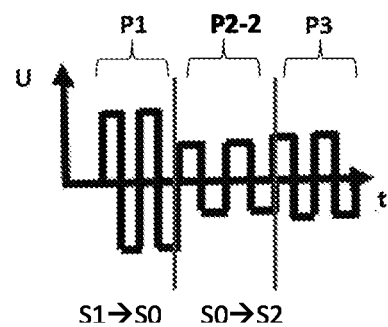
FIG. 5D depicts a three-pulse voltage sequence as a function of time for switching a liquid crystal window from a first stable state to a second stable state according to additional embodiments of the disclosure.

FIG. 5B illustrates a liquid crystal window transitioning from the first stable state S1 to the second stable state S2 via homeotropic state S0 using a three-pulse (P1, P2, P3) voltage sequence. The three-pulse voltage sequence is illustrated in FIG. 5D. A first voltage pulse P1 is applied to transition the liquid crystal window from the first stable state S1 into homeotropic state S0. The first voltage pulse may, for example, have a RMS voltage V1, a duration t1, and a frequency f1. The second voltage pulse P2-2 and third voltage pulse P3 are then applied to transition the liquid crystal window from the homeotropic state S0 into the second stable state S2. The second voltage pulse P2-2 may, for example, have a RMS voltage V2-2, a duration t2-2, and a frequency f2-2. The third voltage pulse V3 can have a RMS voltage V3, a duration t3, and a frequency f3, FIG. 6B illustrates a liquid crystal window transitioning from the third stable state 83 to the second stable state S2 via homeotropic state S0 using a three-pulse (P1, P2, P3) voltage sequence. The three-pulse voltage sequence is illustrated in FIG. GD. A first voltage pulse P1 is applied to transition the liquid crystal window from the third stable state S3 to the homeotropic state S0. The first voltage pulse may, for example, have a RMS voltage V1, a duration t1, and a frequency f1. The second voltage pulse P2-2 and third voltage pulse P3 are then applied to transition the liquid crystal window from the homeotropic state S0 into the second stable state S2. The second voltage pulse P2-2 may, for example, have a RMS voltage V2-2, a duration t2-2, and a frequency f2-2. The third voltage pulse P3 can have a RMS voltage V3, a duration t3, and a frequency f3.

Figure 7E:
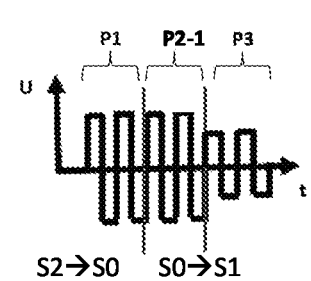
FIG. 7E depicts a three-pulse voltage sequence as a function of time for switching a liquid crystal window from a second stable state to a first stable state according to additional embodiments of the disclosure.

FIG. 76 illustrates a liquid crystal window transitioning from the second stable state S2 to the first stable state S1 via homeotropic state S0 using a three-pulse (P1, P2, P3) voltage sequence. The three-pulse voltage sequence is illustrated in FIG. 7E. A first voltage pulse P1 is applied to transition the liquid crystal window from the second stable state S2 into homeotropic state S0. The first voltage pulse may, for example, have a RMS voltage V1, a duration t1, and a frequency f1 The second voltage pulse P2-1 and third voltage pulse P3 are then applied to transition the liquid crystal window from the homeotropic state S0 into the first stable state S1. The second voltage pulse P2-1 may, for example, have a RMS voltage V2-1, a duration t2-1, and a frequency f2-1. The third voltage pulse P3 can have a RMS voltage V3, a duration t3, and a frequency f3.

Figure 8B:
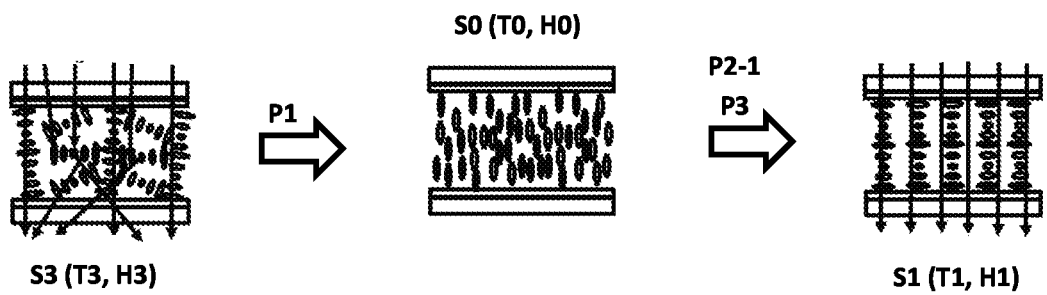
FIG. 8B is a schematic depicting a liquid crystal window switching from a third stable state to a first stable state using a three-pulse voltage sequence.
Figure 8C:
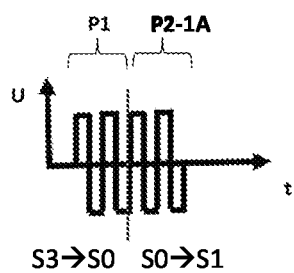
FIG. 8C depicts a two-pulse voltage sequence as a function of time for switching a liquid crystal window from a third stable state to a first stable state according to various embodiments of the disclosure.
Figure 8D:
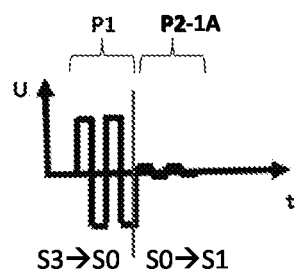
FIG. 8D depicts a three-pulse voltage sequence as a function of time for switching a liquid crystal window from a third stable state to a third stable state according to additional embodiments of the disclosure.
Figure 8E:
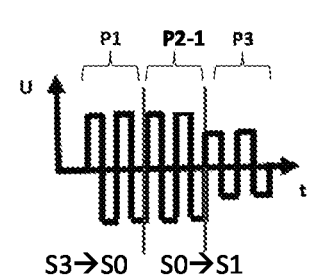
FIG. 8E depicts a three-pulse voltage sequence as a function of time for switching a liquid crystal window from a third stable state to a first stable state according to additional embodiments of the disclosure.

FIG. 8B illustrates a liquid crystal window transitioning from the third stable state S3 to the first stable state S1 via homeotropic state S0 using a three-pulse (P1, P2, P3) voltage sequence. The three-pulse voltage sequence is illustrated in FIG. BE. A first voltage pulse P1 is applied to transition the liquid crystal window from the third stable state S3 to the homeotropic state S0. The first voltage pulse may, for example, have a RMS voltage V1, a duration t1, and a frequency f1. The second voltage pulse P2-1 and third voltage pulse P3 are then applied to transition the liquid crystal window from the homeotropic state S0 into the first stable state S1. The second voltage pulse P2-1 may, for example, have a RMS voltage V2-1, a duration t2-1, and a frequency f2-1. The third voltage pulse P3 can have a RMS voltage V3, a duration t3, and a frequency f3.

For the three-pulse voltage sequences illustrated in FIGS. 3D, 4D, SD, 6D, 7E, and BE, the first voltage pulse P1 applied to achieve homeotropic state S0 can have the same RMS voltage V1, duration t1, and frequency f1, regardless of the original stable state of the window. The RMS voltage V1, duration t1, and frequency f1 can have the same values as those discussed above with respect to the two-pulse voltage sequences. The third voltage pulse P3 may also have the same RMS voltage V3, duration t3, and frequency f3, regardless of the desired stable state to be achieved. By way of non-limiting example, for a liquid crystal window with a cell gap of 20 µm, the RMS voltage V3 can range from about 72 volts to about 100 volts. Referring to FIG. 9, RMS voltage V3 may be approximately equal to Vth1 (or 0.9*V1) in some embodiments. The duration t3 can range from about 0.05 seconds to about 0.2 seconds. The frequency f3 can range from about 100 Hz to about 10,000 Hz, such as from about 500 Hz to about 9,000 Hz, from about 1,000 Hz to about 8,000 Hz, from about 2,000 Hz to about 7,000 Hz, from about 3,000 Hz to about 6,000 Hz, or from about 4,000 Hz to about 5,000 Hz, including all ranges and subranges therebetween.

The RMS voltage of the second voltage pulse can vary depending on the desired stable state to be achieved. For example, the second pulse P2-1 applied to achieve stable (planar) state S1 from homeotropic state S0 (see FIGS. 7-8) can have a RMS voltage V2-1 greater than or equal to about Vth1 (the threshold voltage below which the liquid crystal will start transitioning to focal conic state S2). In some instances, Vth1=0.9*V1 or, stated otherwise RMS voltage V2-1 is greater than or equal to about 0.9*V1. For example, RMS voltage V2-1 can satisfy the condition Vth1≤V2-1≤V1. According to various embodiments, RMS voltage V2-1 can satisfy the condition V3≤V2-1≤V1. In some embodiments, for an exemplary cell gap of 20 µm, RMS voltage V2-1 can range from about 72 volts to about 100 volts.

The second pulse P2-2 applied to achieve stable (focal conical) state S2 from homeotropic state S0 (see FIGS. 5-6) can have a RMS voltage V2-2 less than V1. In some embodiments, RMS voltage V2-2 can be less than RMS voltage V2-1. In additional embodiments, RMS voltage V2-2 can satisfy condition 0<V2-2<Vth2. According to various embodiments, RMS voltage V2-2 can satisfy condition V2-2<V3<V1. In some embodiments, for an exemplary cell gap of 20 µm, RMS voltage V2-2 can range from 0 volts to about 60 volts.

The second pulse P2-3 applied to achieve stable (grayscale) state S3 from homeotropic state S0 (see FIGS. 3-4) can have a RMS voltage V2-3 that satisfies the condition V2-2<V2-3<V1. In some embodiments, RMS voltage V2-3 can range from about 60 volts to about 90 volts, for an exemplary liquid crystal window with a 20 µm cell gap.

The duration and/or frequency of the second voltage pulse can be the same or can also vary depending on the desired stable state to be achieved. For example, the durations t2-1, t2-2, and t2-3 can be the same or different and can be independently chosen from a time period ranging from about 0.001 seconds to about 0.01 seconds, such as from about 0.002 seconds to about 0.009 seconds, from about 0.003 seconds to about 0.008 seconds, from about 0.004 seconds to about 0.007 seconds, or from about 0.005 seconds to about 0.006 seconds, including all ranges and subranges therebetween. Similarly, the frequencies f2-1A, f2-1B, f2-2, and f2-S3 can be the same or different and can be independently chosen from a frequency ranging from about 100 Hz to about 10,000 Hz, such as from about 500 Hz to about 9,000 Hz, from about 1,000 Hz to about 8,000 Hz, from about 2,000 Hz to about 7,000 Hz, from about 3,000 Hz to about 6,000 Hz, or from about 4,000 Hz to about 5,000 Hz, including all ranges and subranges therebetween.

It will be appreciated that the various disclosed embodiments may involve particular features, elements or steps that are described in connection with that particular embodiment. It will also be appreciated that a particular feature, element or step, although described in relation to one particular embodiment, may be interchanged or combined with alternate embodiments in various non-illustrated combinations or permutations.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to a device that comprises A+B+C include embodiments where a device consists of A+B+C and embodiments where a device consists essentially of A+B+C.

It will be apparent to those skilled in the art that various modifications and variations can be made to the present disclosure without departing from the spirit and scope of the disclosure. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

What is claimed is:

1. A liquid crystal window comprising:
   (a) a first glass substrate;
   (b) a second glass substrate;
   (c) an electrode pair disposed between the first and second glass substrates; and
   (d) a cholesteric liquid crystal layer disposed between the first and second glass substrates and in electrical contact with the electrode pair, wherein:
   the cholesteric liquid crystal layer comprises at least three stable states,
   a first stable state is a planar state having a first visible light transmittance T1 and a first haze H1,
   a second stable state is a focal conic state having a second visible light transmittance T2 and a second haze H2,
   a third stable state is grayscale state having a third visible light transmittance T3 and a third haze H3, and
   T1>T3>T2 and H1<H3<H2.

2. The liquid crystal window of claim 1, wherein:
   (a) T1>80% and H1<3%, or
   (b) T2<3% and H2>90%, or
   both (a) and (b).

3. The liquid crystal window of claim 1, wherein:

$$T3 = (T1 + T2)/2, \text{ or} \quad (a)$$
$$H3 = (H1 + H2)/2, \text{ or} \quad (b)$$
both (a) and (b).

4. The liquid crystal window of claim 1, wherein the cholesteric liquid crystal layer comprises a fourth stable state, wherein the fourth stable state is a grayscale state having a fourth visible light transmittance T4 and a fourth haze H4, and wherein T1>T4>T2 and H1<H4<H2.

5. The liquid crystal window of claim 1, wherein the electrode pair comprises a first electrode and a second electrode, and wherein the cholesteric liquid crystal layer is disposed between the first and second electrodes.

6. The liquid crystal window of claim 1, further comprising a third glass substrate and a first interlayer disposed between the first glass substrate and the third glass substrate.

7. The liquid crystal window of claim 1, further comprising a third glass substrate and a sealed gap disposed between the first glass substrate and third glass substrate, the sealed gap comprising at least one insulating gas.

8. The liquid crystal window of claim 1, further comprising a fourth glass substrate and a second interlayer disposed between the second glass substrate and the fourth glass substrate.

9. The liquid crystal window of claim 1, further comprising a fourth glass substrate and a sealed gap disposed between the second glass substrate and fourth glass substrate, the sealed gap comprising at least one insulating gas.

10. The liquid crystal window of claim 1, further comprising at least one additional liquid crystal layer.

11. The liquid crystal window of claim 1, further comprising an electrochromic layer.

12. The liquid crystal window of claim 1, further comprising an interstitial glass substrate disposed between the first and second glass substrates, wherein the cholesteric liquid crystal layer and the electrode pair are disposed between the first glass substrate and the interstitial glass substrate, and wherein an additional liquid crystal layer or an electrochromic layer is disposed between the interstitial glass substrate and the second glass substrate.

13. The liquid crystal window of claim 12, further comprising a second electrode pair disposed between the interstitial glass substrate and the second glass substrate.

14. A method for switching the liquid crystal window of claim 1, the method comprising:
(a) applying a first voltage pulse to the electrode pair to switch the cholesteric liquid crystal layer from the first, second, or third stable state to a homeotropic state; and
(b) applying a second voltage pulse to the electrode pair to switch the cholesteric liquid crystal layer from the homeotropic state to the first, second, or third stable state,
wherein the first voltage pulse has a first RMS voltage V1 that is greater than a second RMS voltage V2 of the second voltage pulse.

15. The method of claim 14, wherein the second RMS voltage to switch the cholesteric liquid crystal layer to the first stable state is represented by V2-1, the second RMS voltage to switch the cholesteric liquid crystal layer to the second stable state is represented by V2-2, and the second RMS voltage to switch the cholesteric liquid crystal layer to the third stable state is represented by V2-3.

16. The method of claim 15, wherein: (a) V2-1<V2-3<V2-2 or (b) V2-2<V2-3<V2-1.

17. The method of claim 16, wherein
applying the second voltage pulse comprises applying the second voltage pulse and a third voltage pulse to switch the cholesteric liquid crystal layer from the homeotropic state to the first, second, or third stable state,
wherein the third voltage pulse has a third RMS voltage V3, and
wherein $$V1 > V2\text{-}1 \geq 0.9 * V1.$$

18. The method of claim 17, wherein one or more of:

$$0.7 * V1 > V2\text{-}2 > 0 \text{ or} \quad (a)$$
$$V1 > V3 > V2\text{-}2, V1 > V3 > V2\text{-}V3 > V2\text{-}2, \quad (b)$$

and
V3 is approximately equal to 0.9*V1.

19. The method of claim 15, wherein:

$$V1 > V2\text{-}1 \geq 0.9 * V1, \text{ or} \quad (a)$$
$$0.1 * V1 > V2\text{-}1 \geq 0. \quad (b)$$

20. The method of claim 15, wherein 0.7*V1>V2-2≥0.4*V1.

21. The method of claim 15, wherein:

$$0.9 * V1 > V2\text{-}3 \geq 0.7 * V1, \text{ or} \quad (a)$$
$$0.7 * V1 > V2\text{-}3 \geq 0.4 * V1. \quad (b)$$

* * * * *